United States Patent
Li et al.

(10) Patent No.: US 11,950,250 B2
(45) Date of Patent: Apr. 2, 2024

(54) UCI DESIGN FOR UL TRANSMISSION WITH CONFIGURED GRANT

(71) Applicant: IPLA HOLDINGS INC., New York, NY (US)

(72) Inventors: Yifan Li, Conshohocken, PA (US); Allan Y. Tsai, Boonton, NJ (US); Qing Li, Princeton Junction, NJ (US); Lakshmi R. Iyer, King of Prussia, PA (US); Mohamed Awadin, Plymouth Meeting, PA (US); Joseph M. Murray, Schwenksville, PA (US); Guodong Zhang, Woodbury, NY (US)

(73) Assignee: IPLA HOLDINGS INC., New York, NY (US)

( * ) Notice: Subject to any disclaimer, the term of this patent is extended or adjusted under 35 U.S.C. 154(b) by 542 days.

(21) Appl. No.: 17/267,213

(22) PCT Filed: Aug. 8, 2019

(86) PCT No.: PCT/US2019/045738
§ 371 (c)(1),
(2) Date: Feb. 9, 2021

(87) PCT Pub. No.: WO2020/033711
PCT Pub. Date: Feb. 13, 2020

(65) Prior Publication Data
US 2021/0315000 A1 Oct. 7, 2021

Related U.S. Application Data

(60) Provisional application No. 62/716,727, filed on Aug. 9, 2018.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0004* (2013.01); *H04L 1/0061* (2013.01);
(Continued)

(58) Field of Classification Search
CPC ............. H04W 72/23; H04W 72/0446; H04W 72/0453; H04W 72/21; H04W 72/20;
(Continued)

(56) References Cited

U.S. PATENT DOCUMENTS

2018/0006790 A1   1/2018  Park
2019/0104535 A1*  4/2019  Golitschek Edler von Elbwart ...
                                          H04W 72/1268
(Continued)

FOREIGN PATENT DOCUMENTS

JP      2017535154 A    11/2017
WO   WO-2018106063 A1   6/2018

OTHER PUBLICATIONS

3rd Generation Partnership Project, Techical Specification Group Radio Access Network, Radio Resource Control (RRC) protocol specification, 3GPP TS 38.331 V15.2.1(Jun. 2018), Jun. 21, 2018.
(Continued)

*Primary Examiner* — Sharmin Chowdhury
(74) *Attorney, Agent, or Firm* — XSENSUS LLP

(57) ABSTRACT

Methods and apparatuses are described herein for uplink control information (UCI) design for uplink (UL) transmission with configured grants. In accordance with one embodiment, a wireless communications device may receive, from a gNB, first information indicating a plurality of resources for a configured grant (CG) on a physical uplink shared channel (PUSCH). The wireless communications device may determine, based on second information, a portion of the plurality of resources to use for transmitting a configured grant-uplink control information (CG-UCI). The wireless
(Continued)

communications device may generate the CG-UCI, wherein the CG-UCI comprises at least one of: an identifier associated with the wireless communications device or an indication of a modulation and coding scheme (MCS). The wireless communications device may transmit, to the gNB on the PUSCH, the CG-UCI using the determined portion of the plurality of resources.

14 Claims, 17 Drawing Sheets

(51) Int. Cl.
  *H04L 1/1812* (2023.01)
  *H04L 1/1867* (2023.01)
  *H04W 72/0446* (2023.01)
  *H04W 72/0453* (2023.01)
  *H04W 72/21* (2023.01)
(52) U.S. Cl.
  CPC .......... *H04L 1/1819* (2013.01); *H04L 1/1896* (2013.01); *H04W 72/0446* (2013.01); *H04W 72/0453* (2013.01); *H04W 72/21* (2023.01)
(58) Field of Classification Search
  CPC ............. H04W 72/1268; H04L 1/0004; H04L 1/0061; H04L 1/1819; H04L 1/1896; H04L 5/0051; H04L 5/0094; H04L 5/0053; H04L 1/0003; H04L 1/0025; H04L 1/0071; H04L 5/0016; H04L 5/0092
  See application file for complete search history.

(56) References Cited

U.S. PATENT DOCUMENTS

2019/0253219 A1\* 8/2019 Fan .......................... H04L 5/001
2019/0342911 A1\* 11/2019 Talarico ................ H04L 1/1614
2021/0250142 A1\* 8/2021 Wang .................... H04L 5/0053

OTHER PUBLICATIONS

CATR , UCI reporting in physical uplink shared channel , 3GPP TSG RAN WG1 AH_1801 R1-1800761, Jan. 12, 2018.
Intel Corporation: "NOMA related procedure", 3GPP Draft; R1-1806533-Intel Noma Procedure, 3rd Generation Partnership Project (3GPP), Mobile Competence Centre, vol. RAN WG1, No. Busan, Korea, May 20, 2018, May 21, 2018-May 25, 2018, XP051441735.
Nokia et al., "Considerations on NOMA Transmitter", 3GPP Draft, R1-1806930_Noma Transmitter, 3rd Generation Partnership Project (3GPP), Mobile Competence Centre: vol. RAN WG1, No. Busan, May 20, 2018, May 21, 2018-May 25, 2018, XP051442129.
Intel Corporation, "Support of PUCCH on Scell for CA", 3GPP TSG-RAN WG1 #80 R1-150085 Feb. 13, 2015.

\* cited by examiner

UCI DESIGN FOR UL TRANSMISSION WITH CONFIGURED GRANT

CROSS-REFERENCE TO RELATED APPLICATIONS

This application is the National Stage Application of International Patent Application No. PCT/US2019/045738 filed Aug. 8, 2019 which claims the benefit of U.S. Provisional Patent Application No. 62/716,727, filed Aug. 9, 2018, which is hereby incorporated by reference in its entirety.

BACKGROUND

Several use cases have been proposed for non-orthogonal multiple access (NOMA) in 5G NR. In grant-free NOMA, a gNB may not know when a UE is to perform an UL transmission or may not know the identity of the UE. In a grant-based scenario, the UE may be configured with dedicated demodulation reference signal (DMRS), so that the gNB may identify the UE by detecting the corresponding DMRS. Further, in grant-free transmissions, an adaptive modulation and coding scheme (MCS), in which a UE may autonomously select its MCS value, may be beneficial to improve the spectral efficiency. In this case, the gNB may need to be notified of the MCS level used by the UE to decode the data.

Accordingly, there is a need for mechanisms for UE identification in grant-free NOMA and mechanisms for MCS selection and reporting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for uplink control information (UCI) design for uplink (UL) transmission with configured grants. A user equipment (UE) may transmit a configured grant-UCI (CG-UCI) on a configured grant physical uplink shared channel (PUSCH) for an UL transmission with a configured grant. The resource used for transmitting the CG-UCI on the PUSCH may be determined and indicated by a gNB to the UE using a technique including but not limited to the following: through a UE-specific RRC configuration message for a UE in the RRC-Connected state; jointly with a UE-specific RRC configuration and DCI signaling for a UE in the RRC-Connected state; through a UE-specific RRC configuration message for a UE at RRC-Inactive state; through a group-specific RRC configuration message for a UE in the RRC-Inactive state; and/or through a cell-specific RRC configuration message for a UE in the RRC-Idle state.

Multiple non-orthogonal multiple access (NOMA) UEs may simultaneously transmit the CG-UCI within the same configured grant using a technique including but not limited to the following: with group-specific scrambling; with group-specific symbol level spreading; with bit level interleaving with group-specific offset; and/or with FDM-ed or frequency domain interlaced resources.

A UE may transmit a CG-UCI on a configured grant PUCCH configured through a dedicated configuration. The UE may indicate the UE ID through the CG-UCI signaling using a technique including but not limited to the following: indicating the CS-RNTI for a UE in the RRC-Connected state; indicating the I-RNTI for a UE in the RRC-Inactive state; indicating the IMSI or DMSI for a UE in the RRC-Idle state; jointly with the local ID within the group and the DMRS used. A UE may be configured with a default MCS value and may autonomously select whether to overwrite the configured MCS for a UL transmission with a configured grant. The UE may indicate whether it overwrites the default MCS value through the CG-UCI signaling using a technique including but not limited to the following: an explicit indication through the CG-UCI bits; and/or an implicit indication through using two different CG-UCI bits length.

A UE may autonomously select the MCS value and indicate the selected MCS value to the gNB for a UL transmission with a configured grant through CG-UCI signaling using a technique including but not limited to the following: an explicit indication of the selected MCS index; and/or indicating the index difference between the selected MCS value and the configured reference MCS index.

In accordance with one embodiment, a wireless communications device may receive, from a gNB, first information indicating a plurality of resources for a configured grant (CG) on a physical uplink shared channel (PUSCH). The wireless communications device may determine, based on second information, a portion of the plurality of resources to use for transmitting a configured grant-uplink control information (CG-UCI). The wireless communications device may generate the CG-UCI, wherein the CG-UCI comprises at least one of: an identifier associated with the wireless communications device or an indication of a modulation and coding scheme (MCS). The wireless communications device may transmit, to the gNB on the PUSCH, the CG-UCI using the determined portion of the plurality of resources.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Methods and apparatuses are described herein for uplink control information (UCI) design for uplink (UL) transmission with configured grants.

The following abbreviations and definitions may be used herein:
ACK Acknowledgement
BWP Bandwidth Part
CDM Code-Domain Multiplexing
CE Control Element
CG Configured Grant
CSI Channel State Information
CS-RNTI Configured Scheduling RNTI
DCI Downlink Control Information
DL Downlink
DMRS Demodulation Reference Signal
DMSI Dynamic Mobile Subscriber Identity
eMBB enhanced Mobile Broadband
FDM Frequency-Division Multiplexing
HARQ Hybrid Automatic Repeat Request
IMSI International Mobile Subscriber Identity
KPI Key Performance Indicators
LTE Long Term Evolution
MAC Medium Access Control
MCS Modulation Coding Scheme
mMTC massive Machine Type Communication
MSB Most Significant Bit
NOMA Non-Orthogonal Multiple Access
NR New Radio
OFDM Orthogonal Frequency-Division Multiplexing
OMA Orthogonal Multiple Access
OSI Other System Information
PDCCH Physical Downlink Control Channel
PUSCH Physical Uplink Shared Data Channel
PTRS Phase Tracking Reference Signal
QAM Quadrature Amplitude Modulation
QoS Quality of Service
QPSK Quadrature Phase-Shift Keying
RE Resource Element
RMSI Remain Minimum System Information
RNTI Radio Network Temporary Identifier
RRC Radio Resource Control
TDM Time-Division Multiplexing
UE User Equipment
UL Uplink
URLLC Ultra-Reliable and Low Latency Communications Long Term Evolution (LTE) systems may use non-orthogonal multiple access (NOMA). The first NOMA application in LTE was introduced for the downlink (DL). The DL NOMA was proposed, and then the necessary mechanisms were investigated to enable LTE to support DL intra-cell multiuser superposition transmission (MUST) for data channels with assistance information from a serving Base Station (BS) to a user equipment (UE) with respect to whether it experienced intra-cell interference. NOMA has also been discussed for use in 5G NR. In the NR NOMA phase 1 study, numerous NOMA schemes have been proposed, mainly targeting uplink (UL) transmissions to support massive connectivity.

Figure 1:
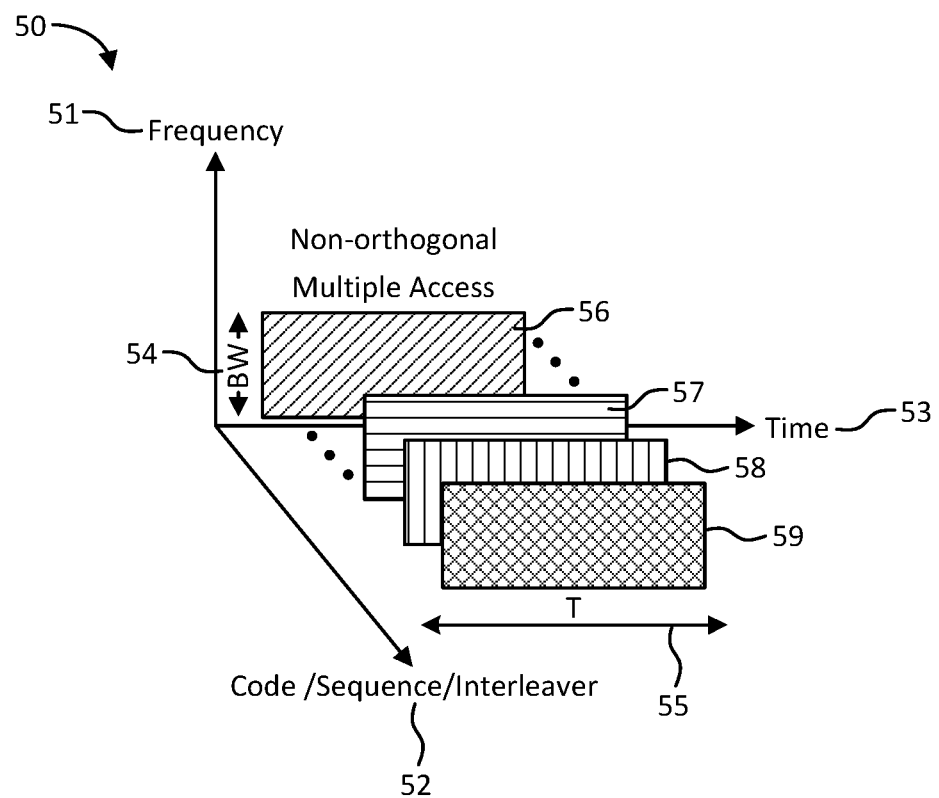
FIG. 1 is a diagram of a non-orthogonal multiple access (NOMA) scheme.

FIG. 1 shows an example NOMA scheme 100. FIG. 1 shows, for multiple UEs, the given frequency 51, time 53, and the code/sequence/interleaver 52. As shown in the example of FIG. 1, UEs 56, 57, 58, and 59 may be multiplexing at a given time 55 and frequency (bandwidth (BW)) 54 resource when operating in a NOMA scheme. There may be significant benefits of NOMA in terms of UL link-level sum throughput and overloading capability, as well as system capacity enhancement in terms of supported packet arrival rate at given system outage.

However, when communicating using a NOMA scheme, there may be interference between transmissions using overlapping resources such as the overlapping resources being used by UEs 56, 57, 58, and 59 in the example of FIG. 1. As the system load increases, i.e. more NOMA UEs share or overlap the resources, this non-orthogonal characteristic (interference between transmissions) may be more pronounced. To combat the interference between non-orthogonal transmissions, transmitter side schemes such as spreading (linear or non-linear, with or without sparseness) and interleaving may be employed to improve performance and ease the burden of advanced receivers.

The main difference between the various proposed NOMA schemes is the multiple access (MA) signature used to enable the non-orthogonal transmission. Based on the MA signature used, the NR NOMA candidate schemes may be categorized as three major types: codebook based, sequence based, and Interleaver or scrambling based.

Several use cases have been proposed for NOMA in 5G NR. For all three major usage scenarios identified in NR (mMTC, URLLC, and eMBB), NOMA is proposed to be adopted. For each use scenario, the benefits may be summarized as follows:

In an mMTC use scenario, the benefits of adopting NOMA may include: providing higher connection density per physical resource with high overloading; and reducing latency, signaling overhead, and power consumption by enabling grant-free access.

In an URLLC use scenario, NOMA may enable efficient use of grant-free transmission and therefore may benefit URLLC low latency use cases. The benefits of adopting NOMA may also include: improving the efficiency of the resource utilization; providing higher reliability through diversity gain achieved by spreading and coding; enhancing the robustness to collision by carefully designing the MA signature; and providing the ability to multiplex mixed traffic types.

In an eMBB use scenario, the benefits of adopting NOMA may include: efficient resource utilization; larger capacity region by non-orthogonal user multiplexing; robustness to fading and interference with code-domain design; and higher cell throughput and efficient link adaptation with relaxed CSI accuracy.

UL transmission without dynamic grants may be supported in NR systems. In NR, two types of transmissions without a dynamic grant (which may also be referred to herein as a configured grant (CG)) are supported:

Configured grant type 1: An uplink grant is provided by RRC and stored as a configured uplink grant. A UE may be configured by the RRC with the configuration of the configured grant, which may include the periodicity and an offset of a resource with respect to SFN=0, time domain resource allocation, frequency domain resource allocation, UE-specific Demodulation Reference Signal (DMRS) configuration, an MCS/TBS value, number of repetitions K, power control, etc.

Configured grant type 2: An uplink grant is provided by PDCCH, and stored or cleared as a configured uplink grant based on L1 signaling indicating configured grant activation or deactivation. RRC may configure a UE with the periodicity, power control and repetitions of the configured grant. The activation downlink control information (DCI), which is carried by the PDCCH scrambled with the CS-RNTI, may indicate the offset, time domain resource allocation, frequency domain resource allocation, UE-specific DMRS configuration, MCS/TBS value, etc.

Configured grant type 1 and type 2 may be configured by RRC per serving cell and per BWP. Multiple configurations may be activated simultaneously on different serving cells. For configured grant type 2, activation and deactivation may be independent among the serving cells.

Uplink control information (UCI) reporting is supported in 5G NR. In NR, UCI may be reported in both the PUCCH and PUSCH. Types of UCI reported in a PUCCH may include HARQ-ACK information, SR, and CSI. A UE may be configured with a dedicated PUCCH resource configuration by the RRC. A PUCCH resource may include a PUCCH resource index, an index of the first PRB prior to frequency hopping, or for no frequency hopping, an index of the first PRB after frequency hopping, an indication for intra-slot frequency hopping, or a configuration for a PUCCH format. In NR, five PUCCH formats, from PUCCH format 0 to PUCCH format 4, are supported. The PUCCH formats may be distinguished by the length of the transmission symbols and the UCI payload bits as shown in Table 1 below.

TABLE 1

PUCCH Formats

| Format type | Length of symbols | Number of bit |
|---|---|---|
| Format 0 | 1 or 2 | HARQ-ACK/SR bits is 1 or 2 |
| Format 1 | ≥4 | HARQ-ACK/SR bits is 1 or 2 |

TABLE 1-continued

PUCCH Formats

| Format type | Length of symbols | Number of bit |
|---|---|---|
| Format 2 | 1 or 2 | UCI bits is more than 2 |
| Format 3 | ≥4 | UCI bits is more than 2 |
| Format 4 | ≥4 | UCI bits is more than 2, the PUCCH resource includes an orthogonal cover code |

A UE may be configured up to four sets of PUCCH resources by higher layer parameter PUCCH-ResourceSet. The UE may determine the PUCCH resource set based on the size of the UCI information bits NUCI. Within one PUCCH resource set, the UE may determine the PUCCH resource based on the PUCCH resource indicator field indicated by the DCI.

A UE may be configured with the PUCCH-Spatialrelationinfo to determine the spatial setting of a PUCCH transmission. The PUCCH-Spatialrelationinfo may be either an SSB index, CSI-RS Index, or SRS. When the PUCCH-Spatialrelationinfo is an SSB index or CSI-RS Index, the UE may transmit the PUCCH using a same spatial domain filter as for a reception of the configured SS/PBCH block or CSI-RS. When the PUCCH-Spatialrelationinfo is SRS, the UE may transmit the PUCCH using a same spatial domain filter as used in a transmission of the configured SRS.

NR supports the UCI being piggybacked on the PUSCH for both the DFT-s-OFDM waveform and the CP-OFDM waveform, and the same UCI resource mapping principles may be used for the PUSCH with the DFT-s-OFDM waveform and the CP-OFDM waveform for frequency first mapping.

The piggybacked UCI may include a HARQ-ACK, CSI part 1 and CSI part 2. For slot-based scheduling, different piggyback rules may be defined for the HARQ-ACK with different lengths. When the HARQ-ACK is more than 2 bits, the PUSCH may be rate matched and the UL-SCH may perform rate matching around the resource elements (REs) piggybacking the HARQ-ACK. When the HARQ-ACK is less than or equal to 2 bits, the PUSCH may be punctured, i.e., the UL-SCH is first mapped to all the available resources and then the HARQ-ACK punctures the UL-SCH in some reserved REs. To utilize the frequency gain, both HARQ-ACK and CSI may be mapped in a distributed way to the REs across all the allocated PRBs. In contrast to LTE, both the HARQ-ACK and CSI may be mapped to all layers of the transport block (TB) on the PUSCH in NR. Another difference with respect to LTE is that, instead of a fixed QPSK modulation in LTE, the modulation order of UCI in NR may follow the modulation order of the UL-SCH.

In NR, the piggybacked UCI may be mapped after the front-loaded DMRS symbol. Within the symbol carrying the DMRS, no FDM is allowed. Starting from the first available non-DMRS symbol after the front-loaded DMRS symbol(s), the HARQ-ACK may first be mapped if it is piggybacked. If the remaining HARQ-ACK fills one entire allocated symbol, then it may occupy the whole symbol. Otherwise, the HARQ-ACK may be evenly mapped in a distributed way in the allocated resources in that symbol.

CSI part 1 may be mapped using the same rules as the HARQ-ACK if it is piggybacked. When both the HARQ-ACK and CSI part 1 are piggybacked, CSI part 1 may not be mapped on the REs already piggybacking the HARQ-ACK for both the more than 2 bits and the less than or equal to 2 bits two scenarios. For the symbol carrying the HARQ- ACK but not fully occupied, CSI part 1 may first be mapped to the unused REs and then mapped to the following symbols.

For CSI part 2, the same rules as CSI part 1 may be applied except when the HARQ-ACK is ≤2 bits, i.e., the PUSCH is punctured. In this scenario, CSI part 2 may be mapped on the reserved HARQ-ACK REs for puncturing and then let the HARQ-ACK puncture the CSI part 2 if it is piggybacked.

The embodiments described herein address several issues in conventional grant-free systems.

One of these issues is that in grant-free NOMA, the gNB may not know when a UE is to perform an UL transmission and the identity of the UE. So, the gNB may need to identify the UE activity first when it receives a packet (i.e. determine which UE has transmitted the data). In a grant-based scenario, the UE may be configured with dedicated DMRS, so that the gNB may identify the UE by detecting the corresponding DMRS. However, in grant-free NOMA, a one to one mapping between the DMRS and the UE may not be feasible due to the limited DMRS port numbers. Therefore, multiple UEs may need to share a DMRS or a DMRS pool. In this case, when a gNB detects one DMRS, the gNB may not know which UE is using this DMRS which means that the gNB may not know which UE is transmitting the data. To solve this problem, mechanisms are described herein for UE identification in grant-free NOMA.

Another issue is that in current type 1 and type 2 grant-free operation, a UE may be configured with one fixed MCS value. However, in grant-free transmissions, adaptive MCS, in which a UE may autonomously select its MCS value, may be beneficial to improve the spectral efficiency. In this case, the gNB may need to be notified of the MCS level used by the UE to decode the data. To support adaptive MCS, additional mechanisms are described herein for MCS selecting and reporting.

In one solution to the issues identified above, a UE may transmit configured grant UCI (CG-UCI) on the configured grant PUSCH for an UL transmission with a configured grant. The resource used for transmitting the CG-UCI on the PUSCH may be determined and may be indicated by the gNB to a UE using a technique including but not limited to the following:

Through a UE-specific RRC configuration message for a UE in the RRC-Connected state;
Jointly with a UE-specific RRC configuration and DCI signaling for a UE in the RRC-Connected state;
Through a UE-specific RRC configuration message for a UE in the RRC-Inactive state;
Through a group-specific RRC configuration message for a UE in the RRC-Inactive state; and
Through a cell-specific RRC configuration message for a UE in the RRC-Idle state.

Further, multiple NOMA UEs may simultaneously transmit the CG-UCI within the same configured grant using a technique including but not limited to the following:
With group-specific scrambling;
With group-specific symbol level spreading;
With bit level interleaving with group-specific offset; and
With FDM-ed or frequency domain interlaced resources.

A UE may transmit the CG-UCI on a configured grant PUCCH configured through dedicated configuration.

The UE may indicate the UE ID through the CG-UCI signaling using a technique including but not limited to the following:
Indicate the CS-RNTI for a UE at RRC-Connected state;
Indicate the I-RNTI for a UE at RRC-Inactive state;
Indicate the IMSI or DMSI for a UE at RRC-Idle state; and
Jointly with the local ID within the group and the DMRS used.

In another solution to the issues identified above, a UE may be configured with a default MCS value and may autonomously select it to overwrite the configured MCS for the UL transmission with the configured grant. The UE may indicate if it overwrites the default MCS value through the CG-UCI signaling using a technique including but not limited to the following:
Explicit indication through the CG-UCI bits; and
Implicit indication through using two different CG-UCI bits length.

A UE may autonomously select the MCS value and may indicate the selected MCS value to the gNB for an UL transmission with a configured grant through the CG-UCI signaling using a technique including but not limited to the following:
Explicitly indicate the selected MCS index; and
Indicate the index difference between the selected MCS value and the configured reference MCS index.

Figure 2:
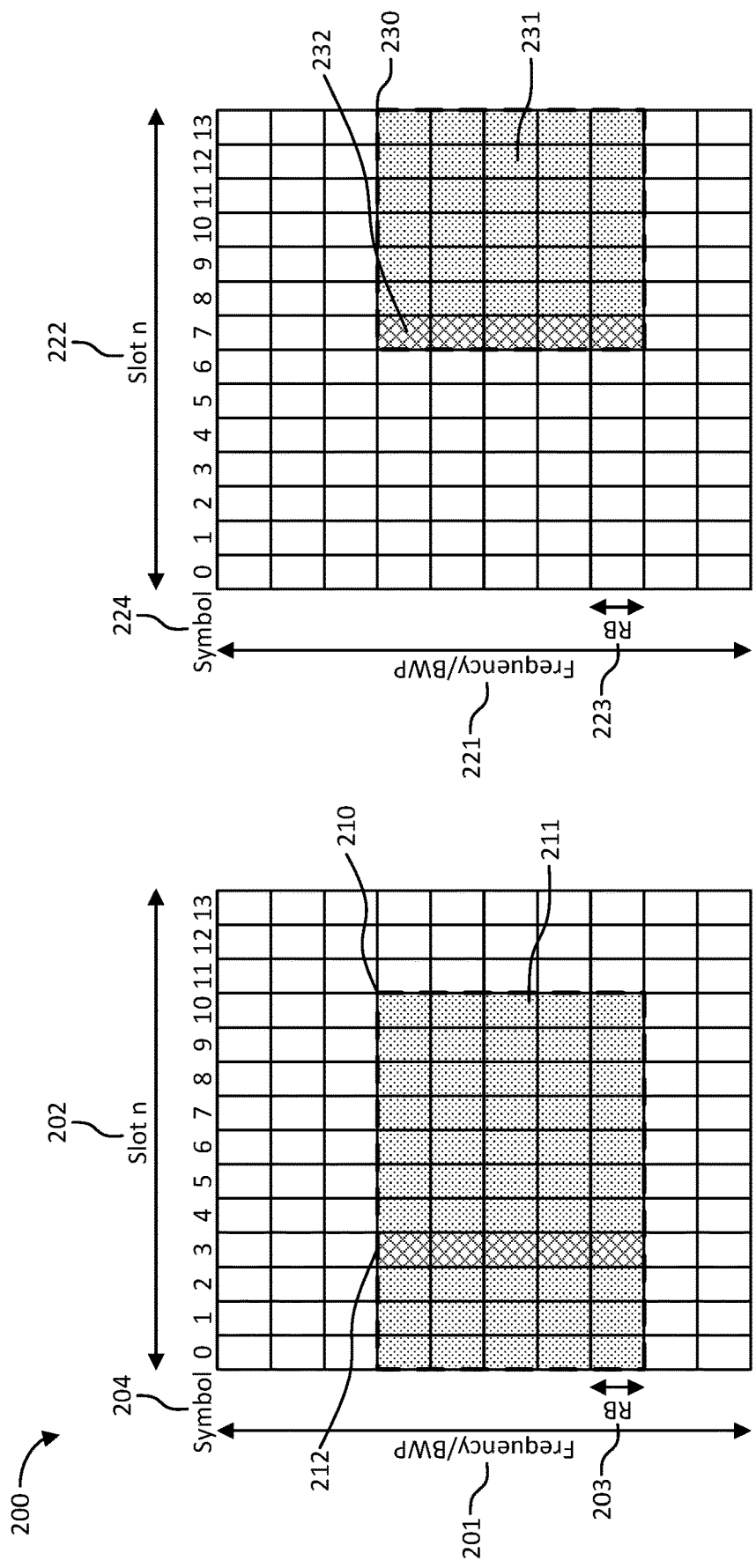
FIG. 2A is a diagram of an example of a configured grant with PUSCH mapping type A.
FIG. 2B is a diagram of an example of a configured grant with PUSCH mapping type B.

FIGS. 2A and 2B provide NR examples in which a UE is configured with a CG by the gNB. The CG may indicate the PUSCH resource (CG-PUSCH) that can be used by the UE for an UL transmission without a dynamic grant.

FIG. 2A shows an example of a CG with a PUSCH mapping type A 200. FIG. 2A shows the frequency/BWP 201 and the slot n 202 in the time domain. Slot n 202 comprises 14 symbols 204 in the time domain. FIG. 2A also shows a plurality of resource blocks (RBs) 203 each comprising 12 subcarriers/resource elements (REs) in the frequency/BWP 201 domain and a symbol 204 in the time domain. The CG 210 comprises a plurality of REs as shown in FIG. 2A. The CG 210 comprises REs for the CG-PUSCH 211 and REs for the DMRS for the CG-PUSCH 212.

FIG. 2B shows an example of a CG with a PUSCH mapping type B. FIG. 2B shows the frequency/BWP 221 and the slot n 222 in the time domain. Slot n 222 comprises 14 symbols 224 in the time domain. FIG. 2B also shows a plurality of RBs 223 each comprising 12 subcarriers/REs in the frequency/BWP 221 domain and a symbol 224 in the time domain. The CG 230 comprises a plurality of REs as shown in FIG. 2B. The CG 230 comprises REs for the CG-PUSCH 231 and REs for the DMRS for the CG-PUSCH 232.

The CG 230 in FIG. 2B starts at symbol 7 in the time domain, whereas the CG 210 in FIG. 2A starts at symbol 0 in the time domain.

In accordance with one embodiment, a UE may transmit a CG-UCI for an UL transmission using the CG, such as the example CGs in FIG. 2A and FIG. 2B. The CG-UCI may be transmitted on the PUSCH configured by the CG. The resource used to transmit the CG-UCI within the PUSCH may be pre-specified or configured/signaled to the UE. For example, for a UE in the RRC-Connected state with a configured grant type 1, the UE may be configured with the RRC parameter ConfiguredGrantUCILength to configure the number of symbols used for transmitting the CG-UCI. The RRC parameter ConfiguredGrantUCILength may be carried by RRC information element ConfiguredGrantConfig. The following is an example of an RRC configuration with RRC ConfiguredGrantUCILength:

-- ASN1START
-- TAG- CONFIGUREDGRANTCONFIG- START
ConfiguredGrantUCILength ::=INTEGER (1 . . . 2)
-- TAG- CONFIGUREDGRANTCONFIG- STOP
-- ASN1STOP For a UE in the RRC-Connected state with a configured grant type 2, the UE may be configured with the RRC parameter ConfiguredGrantUCILength to configure the number of symbols used for transmitting the CG-UCI. Alternatively or additionally, a one bit field CG-UCI Length Indicator may be signaled to the UE through the activation DCI with the CRC scrambled with the CS-RNTI to indicate the number of symbols used for transmitting the CG-UCI. An example of the DCI field CG-UCI Length Indicator is shown in Table 2 below. If a UE is indicated by the DCI field CG-UCI Length Indicator to be '0', the UE may determine which resource to use, and the resource may comprise one symbol to transmit the CG-UCI in the PUSCH configured by configured grant. Otherwise, the UE may use two symbols.

TABLE 2

Example of CG-UCI Length Indicator

| Bit field | DCI Content Function |
|---|---|
| 0 | One symbol is used to transmit the CG-UCI |
| 1 | Two symbols are used to transmit the CG-UCI |

For a UE in the RRC-Inactive state, the UE may be configured with an RRC parameter, ConfiguredGrantInactiveUCILength, in order to configure the number of symbols used for transmitting the CG-UCI.

In accordance with one example, the RRC parameter ConfiguredGrantInactiveUCILength may be configured through the UE-specific RRC configuration before the UE performs the transition from the RRC-Connected state to the RRC-Inactive state. This example may apply to the UEs configured with configured grant type 1 and type 2. For example, the RRC parameter ConfiguredGrantInactiveUCI-Length may be configured through RRC configuration ConfiguredGrantInactiveConfg indicating the resource(s) and related parameters for RRC-Inactive state; or through the RRC message RRCRelease that is used by a gNB to trigger a UE to switch from RRC-Connected state to RRC-Inactive state. In this case, the UE context related RRC-Inactive state configurations may have to be stored at both UE and gNB.

In another example, the RRC parameter ConfiguredGrantInactiveUCILength may be configured through the broadcasting message on the common or shared channel at the RRC-Inactive state, e.g., OSI, the remain minimum system information (RMSI). This approach may apply to UEs configured with configured grant type 1 and type 2.

In yet another example, the resource used to transmit the CG-UCI may be signaled by DCI at the common search space scrambled by INACTIVEGROUP-RNTI to a group of UEs in the RRC-Inactive state. This approach may apply to the UEs configured with configured grant type 2. The following is an example of an RRC configuration with RRC ConfiguredGrantInactiveUCILength -- ASN1START
-- TAG- CONFIGUREDGRANTINACTIVECONFIG- START
ConfiguredGrantInactiveUCILength::=INTEGER (1 . . . 2)
-- TAG- CONFIGUREDGRANTINACTIVECONFIG- STOP
-- ASN1STOP For a UE working in RRC-Idle state, the resource used to transmit the CG-UCI may be configured through the broadcasting message on the common or shared channel. For example, the RRC parameter, ConfiguredGrantIdleUCILength, may be configured via the other system information (OSI) or via the RMSI. The following is an example of an RRC configuration with RRC ConfiguredGrantIdleUCILength:

-- ASN1START
-- TAG- CONFIGUREDGRANTIDLECONFIG- START
ConfiguredGrantIdleUCILength::=INTEGER (1 . . . 2)
-- TAG- CONFIGUREDGRANTIDLECONFIG- STOP
-- ASN1STOP Instead of being configured with the number of symbols used to transmit the CG-UCI on the configured grant PUSCH, a $\beta_{offset}^{CG-UCI}$ value may be configured for the UE via RRC and may be used to compute the resources for transmitting the CG-UCI on the CG-PUSCH. The number of coded modulation symbols per layer for CG-UCI transmission, denoted as $Q'_{CG-UCI}$, may be determined as follows:

$$Q'_{CG-UCI} = \left\{ \min \left[ \frac{(O_{CG-UCI} + L_{CG-UCI}) \cdot \beta_{offset}^{CG-UCI} \cdot \sum_{l=0}^{N_{symb,f}^{PUSCH}-1} M_{sc}^{UCI}(l)}{\sum_{r=0}^{C_{UL-SCH}-1} K_r} \right], \left[ \alpha \cdot \sum_{l=l_0}^{N_{symb,p}^{PUSCH}-1} M_{sc}^{UCI}(l) \right] \right\}$$

where:

$O_{CG-UCI}$ is the number of CG-UCI bits;

$L_{CG-UCI}$ is the number of CRC bits for CG-UCI;

$C_{UL-SCH}$ is the number of code blocks for UL-SCH of the configured grant PUSCH transmission;

$K_r$ is the rth code block size for UL-SCH of the PUSCH transmission;

$M_{sc}^{PUSCH}$ is the scheduled bandwidth of the configured grant PUSCH transmission, expressed as a number of subcarriers;

$M_{sc}^{PT-RS}(l)$ is the number of subcarriers in OFDM symbol l that carries PTRS, in the configured grant PUSCH transmission;

$M_{sc}^{UCI}(l)$ is the number of resource elements that can be used for transmission of CG-UCI in OFDM symbol l, in the configured grant PUSCH transmission;

for any OFDM symbol that carries DMRS of the configured grant PUSCH, $M_{sc}^{UCI}(l)=0$;

for any OFDM symbol that does not carry DMRS of the configured grant PUSCH, $M_{sc}^{UCI}(l)=M_{sc}^{PUSCH}-M_{sc}^{PT-RS}(l)$;

$N_{symb,f}^{PUSCH}$ is the total number of OFDM symbols of the full-length configured grant PUSCH transmission configured to the UE, including all OFDM symbols used for DMRS;

$N_{symb,p}^{PUSCH}$ is the total number of OFDM symbols of the shortest PUSCH transmission configured to the UE, including all OFDM symbols used for DMRS; here, p≤f;

$\alpha \in \{0.5, 0.65, 0.8, 1\}$ is configured by higher layer parameter uci-on-pusch-scaling; and $l_0$ is the symbol index of the first OFDM symbol that does not carry DMRS of the configured grant PUSCH, after the first DMRS symbol(s), in the configured grant PUSCH transmission.

A UE may transmit the CG-UCI in uplink transmissions using the CG including both the initial transmission and the repetition. For the symbols used by a UE to transmit the CG-UCI in the configured grant PUSCH, techniques such as the ones described below may be applied.

Figure 3:
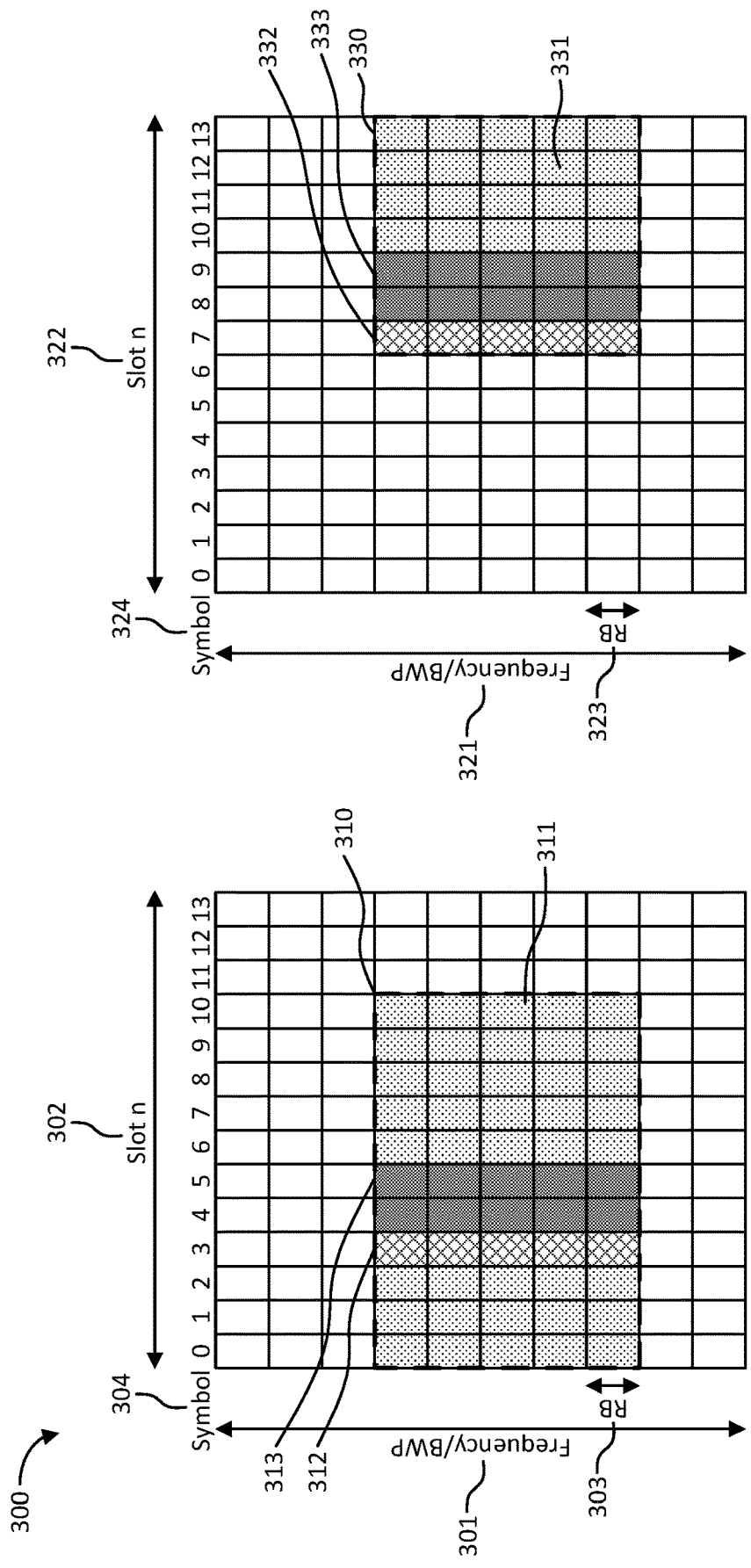
FIG. 3A is a diagram of an example of a CG-UCI transmitted on the PUSCH after the front loaded DMRS symbol for a configured grant with PUSCH mapping type A.
FIG. 3B is a diagram of an example of a CG-UCI transmitted on the PUSCH after the front loaded DMRS symbol for a configured grant with PUSCH mapping type B.

FIG. 3A shows an example in which a UE with a PUSCH mapping type A transmits a CG-UCI on the PUSCH for the configured grant 300 in accordance with one embodiment, which may be used in combination with any of the embodiments described herein. FIG. 3A shows the frequency/BWP 301 and the slot n 302 in the time domain. Slot n 302 comprises 14 symbols 304 in the time domain. FIG. 3A also shows a plurality of RBs 303 each comprising 12 subcarriers/REs in the frequency/BWP 301 domain and a symbol 304 in the time domain. The CG 310 comprises a plurality of REs as shown in FIG. 3A. The CG 310 comprises REs for the CG-PUSCH 311 and REs for the DMRS for the CG-PUSCH 312. In the example of FIG. 3A, the UE may map modulated CG-UCI symbols 313 starting from the first available symbol in the CG 310 after the front loaded DMRS for the CG-PUSCH 312.

FIG. 3B shows an example in which a UE with a PUSCH mapping type B transmits a CG-UCI on the PUSCH for the configured grant in accordance with one embodiment, which may be used in combination with any of the embodiments described herein. FIG. 3B shows the frequency/BWP 321 and the slot n 322 in the time domain. Slot n 322 comprises 14 symbols 324 in the time domain. FIG. 3B also shows a plurality of RBs 323 each comprising 12 subcarriers/REs in the frequency/BWP 321 domain and a symbol 324 in the time domain. The CG 330 comprises a plurality of REs as shown in FIG. 3B. The CG 330 comprises REs for the CG-PUSCH 331 and REs for the DMRS for the CG-PUSCH 332. In the example of FIG. 3B, the UE may map modulated CG-UCI symbols 333 starting from the first available symbol in the CG after the front loaded DMRS for the CG-PUSCH 332.

If the UE in either the example of FIG. 3A or FIG. 3B has an ACK or a CSI to be piggybacked on the PUSCH, the UE may not map the ACK and CSI to the symbols carrying the CG-UCI; the UE may map the modulated HARQ-ACK symbols to the symbols starting from the first available symbol that is not carrying the DMRS or the CG-UCI after the front loaded DMRS. For example, if the front loaded DMRS is transmitted on symbol k, the modulated CG-UCI symbols may be mapped to symbol k+1 to symbol k+n, where n is the number of symbols used for transmitting the CG-UCI. The modulated HARQ-ACK symbols may be mapped to the symbol starting from symbol k+n+1.

Figure 4:
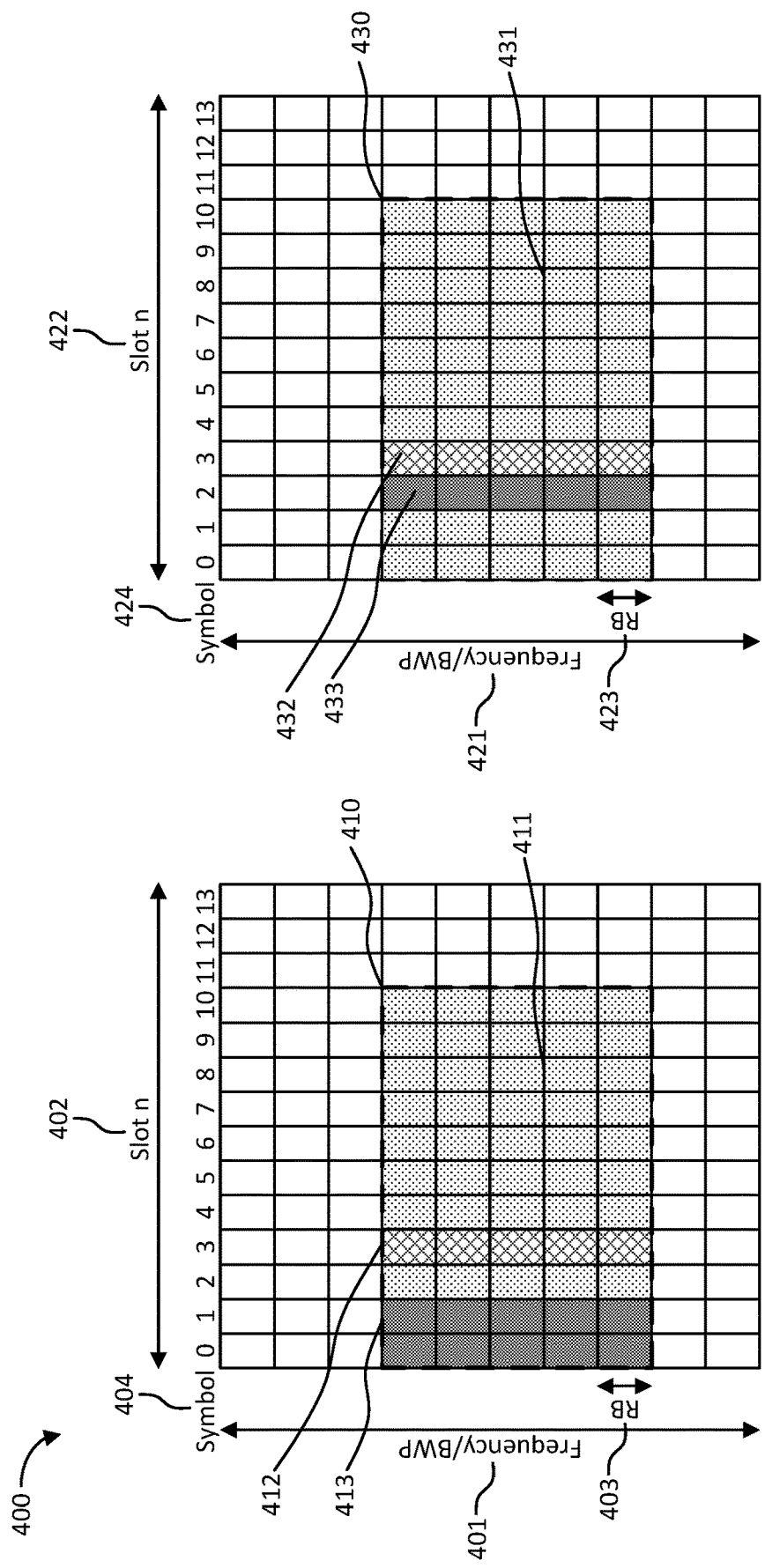
FIG. 4A is a diagram of an example of a CG-UCI transmitted on the PUSCH before the front loaded DMRS symbol for a configured grant starting from the first symbol of the PUSCH.
FIG. 4B is a diagram of an example of a CG-UCI transmitted on the PUSCH before the front loaded DMRS symbol for a configured grant CG-UCI transmitted on the symbol adjacent to the front loaded DMRS symbol.

FIG. 4A shows another example in which a UE with a PUSCH mapping type A transmits a CG-UCI on the PUSCH for the configured grant 400 in accordance with one embodiment, which may be used in combination with any of the embodiments described herein. FIG. 4A shows the frequency/BWP 401 and the slot n 402 in the time domain. Slot n 402 comprises 14 symbols 404 in the time domain. FIG. 4A also shows a plurality of RBs 403 each comprising 12 subcarriers/REs in the frequency/BWP 401 domain and a symbol 404 in the time domain. The CG 410 comprises a plurality of REs as shown in FIG. 4A. The CG 410 comprises REs for the CG-PUSCH 411 and REs for the DMRS for the CG-PUSCH 412. In the example of FIG. 4A, the UE may map modulated CG-UCI symbols 413 starting from the first symbol of the CG-PUSCH 411. For example, if the UE is configured with n symbols for transmitting the CG-UCI 413, the UE may transmit the CG-UCI 413 on symbol 0 to symbol n-1 of the CG-PUSCH 411. In this case, if the UE has an HARQ-ACK to be piggybacked, the UE may map the modulated HARQ-ACK symbols to the symbols starting from the first available symbol not carrying the DMRS after the front loaded DMRS for the CG-PUSCH 412 or after the CG-UCI 413. If the UE has a CSI to be piggybacked, the UE may not map the CSI part 1 and/or CSI part 2 to the symbols carrying the CG-UCI 413. The UE may map the modulated CSI part 1 and/or CSI part 2 symbols to the symbols starting from the first available symbol that is not carrying the loaded DMRS for the CG-PUSCH 412 or after the CG-UCI 413.

FIG. 4B shows another example in which a UE with a PUSCH mapping type A transmits a CG-UCI on the PUSCH for the configured grant in accordance with one embodiment, which may be used in combination with any of the embodiments described herein. FIG. 4B shows the frequency/BWP 421 and the slot n 422 in the time domain. Slot n 422 comprises 14 symbols 424 in the time domain. FIG. 4B also shows a plurality of RBs 423 each comprising 12 subcarriers/REs in the frequency/BWP 421 domain and a symbol 424 in the time domain. The CG 430 comprises a plurality of REs as shown in FIG. 4B. The CG 430 comprises REs for the CG-PUSCH 431 and REs for the DMRS for the CG-PUSCH 432. In the example of FIG. 4B, the UE may map the modulated CG-UCI symbols 433 to the adjacent symbols before the first front loaded DMRS for the CG-PUSCH 432. For example, if the front loaded DMRS for the CG-PUSCH 432 is transmitted on symbol k, the modulated CG-UCI symbols 433 may be mapped to symbol k-n to symbol k-1, where n is the number of symbols used for transmitting the CG-UCI 433. In this case, if the UE has HARQ-ACK to be piggybacked, the UE may map the modulated HARQ-ACK symbols to the symbols starting from the first available symbol after the DMRS for the CG-PUSCH 432. If the UE has CSI to be piggybacked, the UE may not map the CSI part 1 and/or CSI part 2 to the symbols carrying the CG-UCI 433. The UE may map the modulated CSI part 1 and/or CSI part 2 symbols to the symbols starting from the first available symbol that is not carrying the loaded DMRS for the CG-PUSCH 432 or after the CG-UCI 433.

Figure 5:
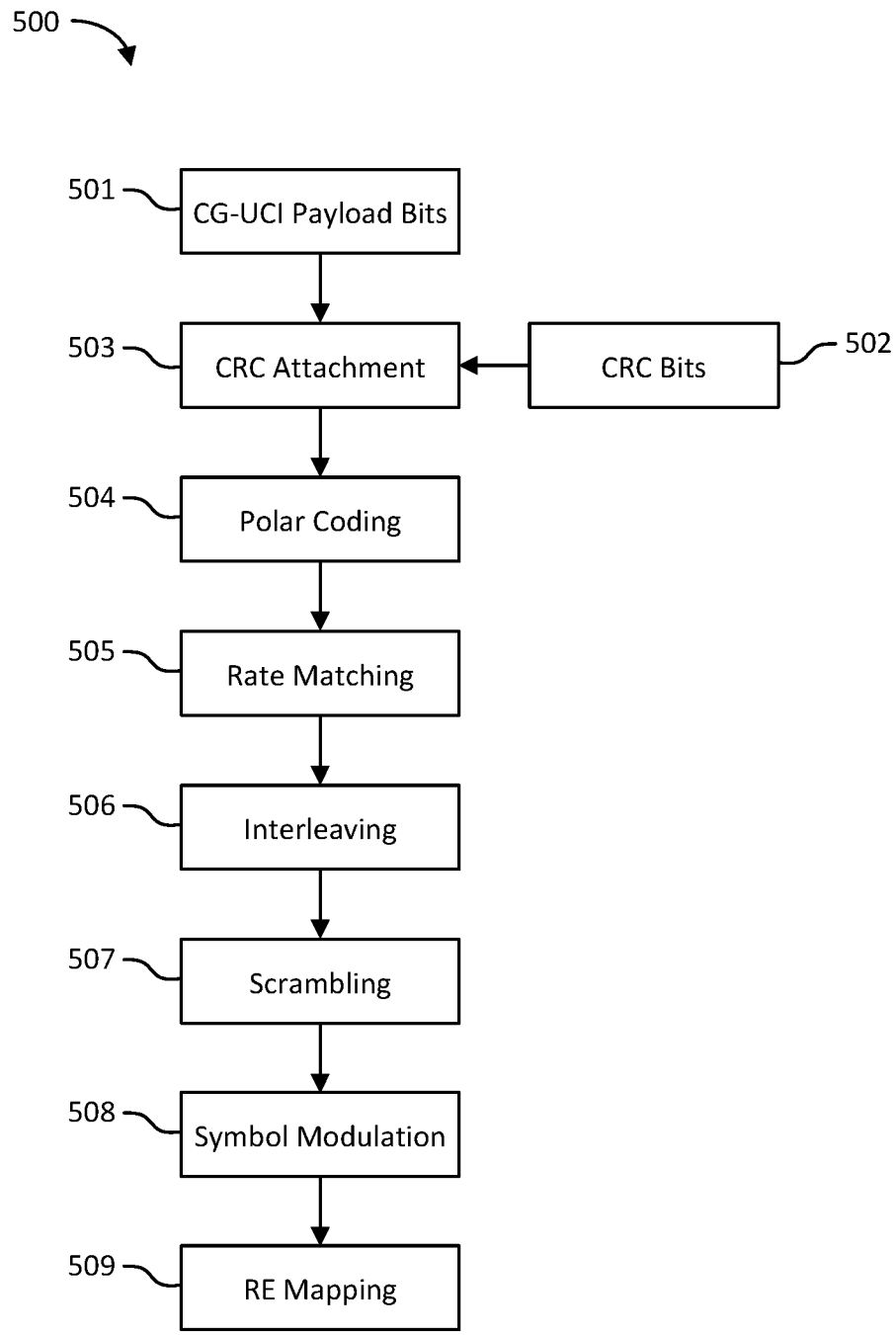
FIG. 5 is a diagram of an example of a data flow for a CG-UCI symbol generation.

FIG. 5 shows an example data flow for modulated CG-UCI symbol generation 500 in accordance with one embodiment, which may be used in combination with any of the embodiments described herein. In this example, the CG-UCI on the PUSCH may be configured by a CG for NOMA. Referring to FIG. 5, the CG-UCI payload bits may be generated (step 501), the Cyclic Redundancy Check (CRC) parity bits may be generated (step 502), and then the bits of the CG-UCI payload may be attached with the CRC parity bits (step 503). The output bit sequence may be encoded by the Polar code (step 504) and rate matched to an output sequence with length E_tot (step 505). The rate matching output bit sequence may be interleaved by a triangular interleaver (step 506). The interleaving output sequence may be scrambled prior to modulation (step 507). After the modulation (step 508), the modulated symbols may be mapped to the resource for transmitting the CG-UCI (step 509).

In grant-free NOMA, multiple UEs may perform UL transmission at the same time using the same configured grant resource. Accordingly, the system may be able to decode the CG-UCIs transmitted by multiple UEs at the same time. To improve the robustness of the CG-UCI transmission, NOMA UEs may transmit the CG-UCI using techniques including but not limited to the following:

(1) When a same time and frequency domain resource is used by the UEs configured with the same configured grant to transmit the CG-UCI, the CG-UCIs transmitted by different UEs may be scrambled with a group specific scrambling sequence. For example, a UE may be configured with a group ID $N_{ID,CG-UCI}^{Group}$. The scrambling sequence generator may be initialized by the configured group ID with:

$$C_{init}=n_{RNTI}\cdot 2^{15}+N_{ID,CG-UCI}^{Group}$$

A one-to-one association between the DMRS and the scrambling sequence may be used. The DMRS here may refer to a DMRS port or a DMRS port with a certain initializer or certain cyclic shift. In one example, one group of UEs may be configured with the same DMRS port. The UEs configured with the same DMRS port may be configured with the same group ID $N_{ID,CG-UCI}^{Group}$.

In another example, multiple groups of UEs where different initializers or different cyclic shifts are configured to each group respectively may be configured with the same DMRS port. For example, DMRS port 1 may be configured to group 1, group 2 ... group n where the DMRS sequence used by the UEs in the group 1, 2 ... n may be initialized by the group specific RNTI G-RNTI 1, G-RNTI 2, ..., G-RNTI n respectively. The UEs configured with the same DMRS port and the same initializer/cyclic shift may be configured with the same group ID $N_{ID,CG-UCI}^{Group}$.

Figure 6:
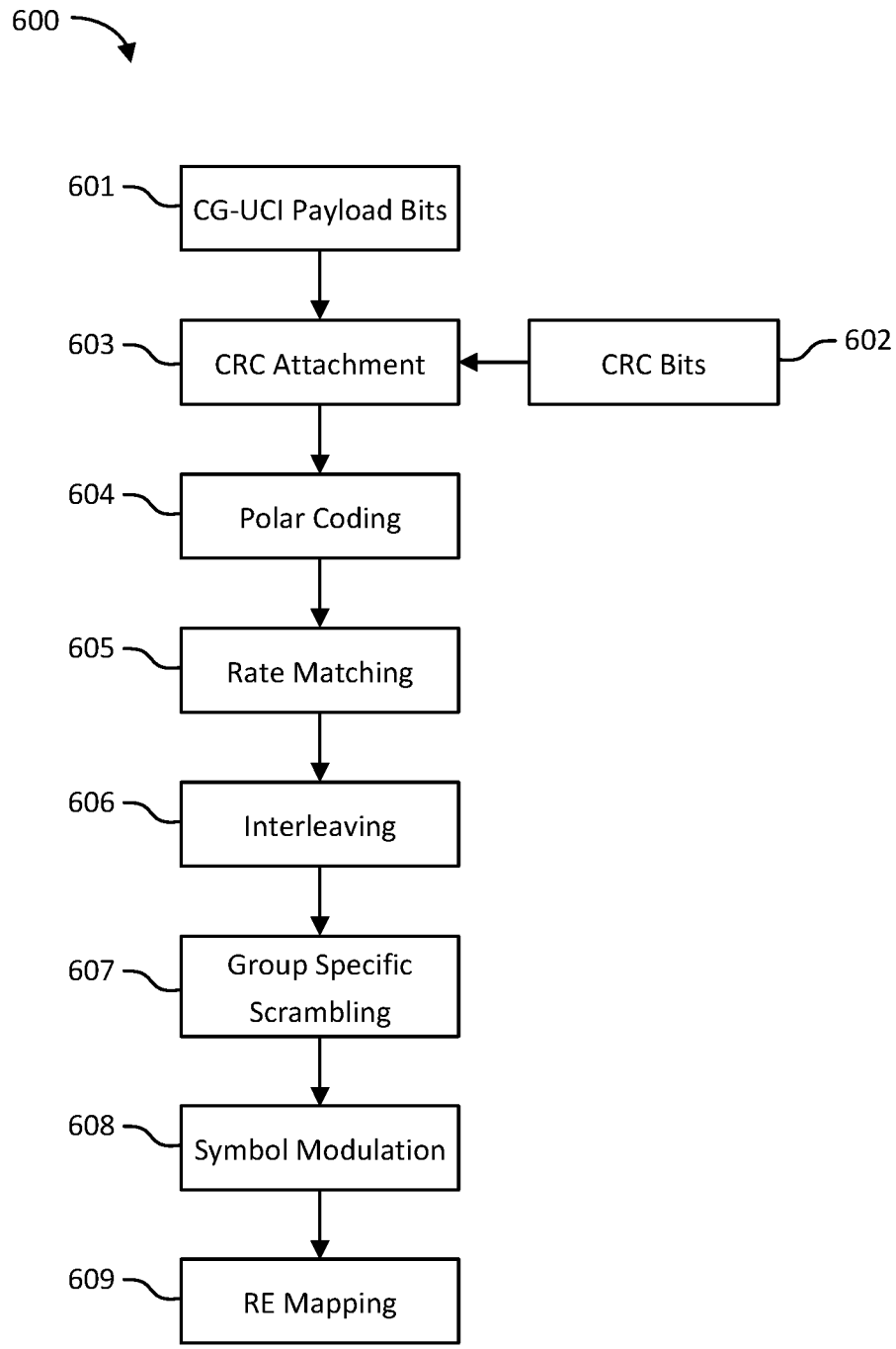
FIG. 6 is a diagram of an example of a data flow for a CG-UCI symbol generation with group specific scrambling.

FIG. 6 shows an example data flow for modulated CG-UCI symbol generation with group specific scrambling 600 in accordance with one embodiment, which may be used in combination with any of the embodiments described herein. Referring to FIG. 6, the CG-UCI payload bits may be generated (step 601), CRC parity bits may be generated (step 602), and then the bits of the CG-UCI payload may be attached with the CRC parity bits (step 603). The output bit sequence may be encoded by the Polar code (step 604) and rate matched to an output sequence with length E_tot (step 605). The rate matching output bit sequence may be interleaved by a triangular interleaver (step 606). The interleaving output sequence may be scrambled prior to modulation with group specific scrambling as described above (step 607). After the modulation (step 608), the modulated symbols may be mapped to the resource for transmitting the CG-UCI (step 609).

(2) When a same time and frequency domain resource is used by the UEs configured with the same configured grant to transmit the CG-UCI, the CG-UCIs transmitted by different UEs may be spread with different symbol level spreading codes. A UE may be configured with the spreading factor $N_{SF,CG-UCI}$, and UE specific or group specific spreading code. When performing the rate matching, the UE may rate match the input bit sequence to the output bit sequence with total length $E_{tot}=K_{RM}\cdot N_{symb,CG-UCI}\cdot N_{PRB,CG-UCI}/N_{SF,CG-UCI}$, where $K_{RM}$ is a constant depending on the modulation order, $N_{symb,CG-UCI}$ is the number of symbols assigned for CG-UCI transmitting, and $N_{PRB,CG-UCI}$ is the number of RBs assigned for CG-UCI transmitting. The UE may use the cell ID to initialize the scrambling sequence generator and generate the scrambling sequence. Or a UE may be configured with the group ID $N_{ID,CG-UCI}^{Group}$ to initialize the scrambling sequence generator and generate the scrambling sequence. After the modulation, the UE may apply the configured spreading code to spread the CG-UCI symbols to the configured resource.

A one to one association between the DMRS and spreading code may be used. The DMRS here may refer to a DMRS port or a DMRS port with a certain initializer or a certain cyclic shift. In an example, one group of UEs may be configured with the same DMRS port. The UEs configured with same DMRS port may be configured with the same spreading code.

In another example, multiple groups of UEs where different initializers or different cyclic shifts are configured to each group respectively may be configured with the same DMRS port. The UEs may be configured with the same DMRS port and the same initializer/cyclic shift may be configured with the same spreading code.

A UE may spread the modulated CG-UCI symbols by frequency domain spreading or a combination of frequency and time domain spreading. For example, if the spreading factor $N_{SF,CG-UCI}=4$, frequency-domain orthogonal code {1 1 1 1} {1 1–1 –1} {1–1 1–1} and {1–1 –1 1} may be configured to the UEs in different groups.

Figure 7:
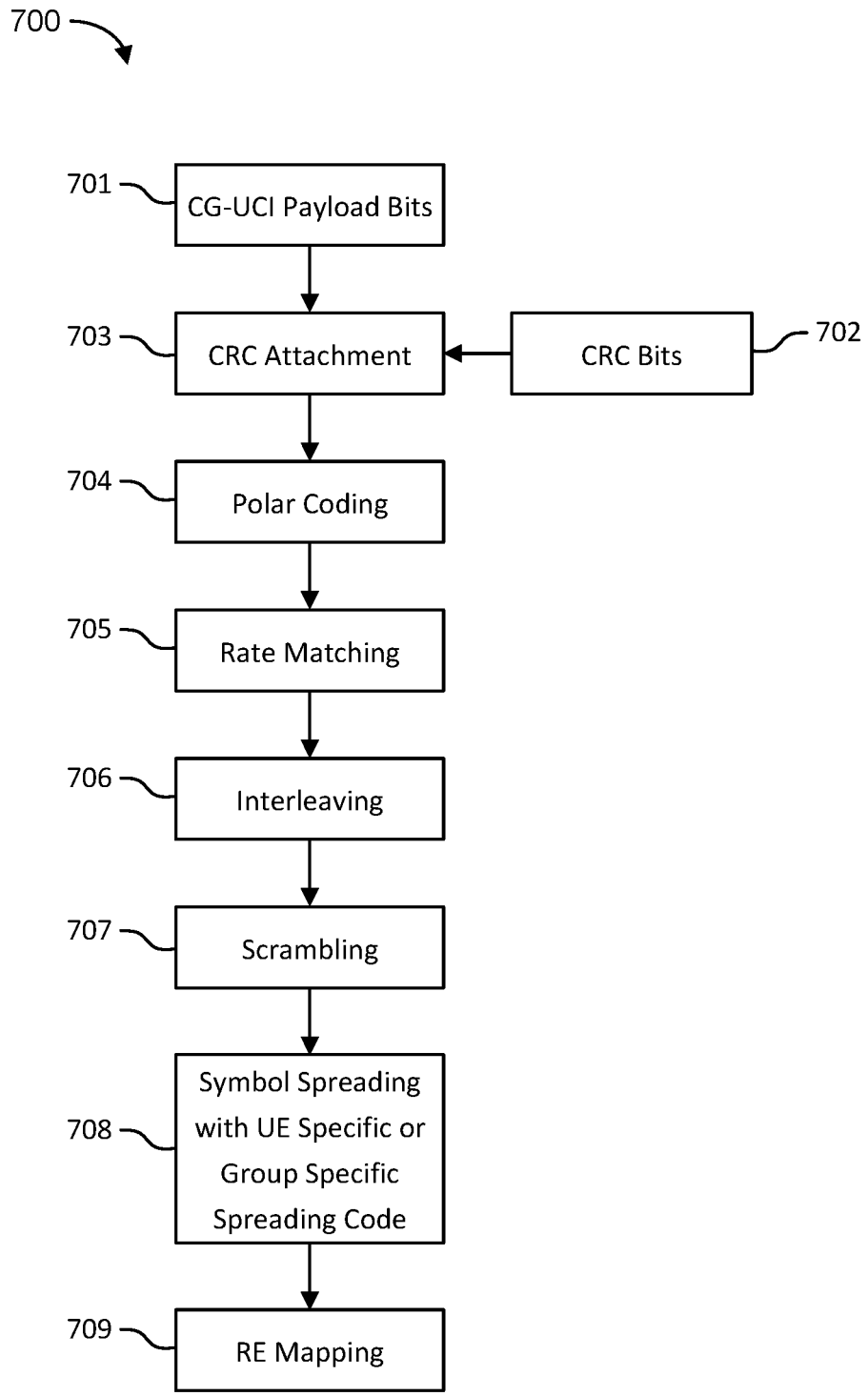
FIG. 7 is a diagram of an example data flow for a CG-UCI symbol generation with symbol level spreading.

FIG. 7 shows an example data flow for modulated CG-UCI symbol generation with symbol level spreading 700 in accordance with one embodiment, which may be used in combination with any of the embodiments described herein. Referring to FIG. 7, the CG-UCI payload bits may be generated (step 701), the CRC parity bits may be generated (step 702), and then the bits of the CG-UCI payload may be attached with the CRC parity bits (step 703). The output bit sequence may be encoded by the Polar code (step 704) and rate matched to an output sequence with length E_tot (step 705). The rate matching output bit sequence may be interleaved by a triangular interleaver (step 706). The interleaving output sequence may be scrambled prior to symbol spreading (step 707). The scrambled output sequence may be modulated and spread with different symbol level spreading codes with a UE specific or group specific spreading code prior to modulation as described above (step 708). After the symbol spreading (step 708), the spread symbols may be mapped to the resource for transmitting the CG-UCI (step 709).

(3) When a same time and frequency domain resource is used by the UEs configured with the same configured grant to transmit the CG-UCI, the CG-UCIs transmitted by different UEs may be interleaved by different bit level interleaver. Assuming the input bits of the block interleaver are denoted by $e_0, e_1, e_2, \ldots, e_{E-1}$, where E is the number of the bits, the output bit sequence may be derived as follows:

Determine T as the smallest integer such that $Q=T(T+1)/2 \geq E$.

If $Q>E$, then the input bit sequence $e_0, e_1, e_2, \ldots, e_{E-1}$ is padded with Q–E dummy bits such that $y_k=e_k$ for $k=0, 1, 2, \ldots, E-1$ and $y_k=<NULL>$ for $k=E, E+1, \ldots, Q-1$. Then the bit sequence $y_0, y_1, y_2, \ldots, y_{Q-1}$ is written into the isosceles right triangle row by row starting with bit $y_0$ in column 0 of row 0. An example of the filled isosceles right triangle is given as follow:

$$\begin{bmatrix} y_0 & y_1 & y_2 & \cdots & y_{T-3} & y_{T-2} & y_{T-1} \\ y_T & y_{T+1} & y_{T+2} & \cdots & y_{2T-3} & y_{2T-2} \\ y_{2T-1} & y_{2T} & y_{2T+1} & \cdots \\ \cdots & \cdots & \cdots & \cdots \\ y_{Q-6} & y_{Q-5} & y_{Q-4} \\ y_{Q-3} & y_{Q-2} \\ y_{Q-1} \end{bmatrix}$$

The output of the block interleaver may be the bit sequence read out from the above matrix, column by column, starting with bit $y_0$ in row 0 of column 0 with skipping all the empty and NULL element. A UE may be configured with a UE specific or group specific interleaving offset $n_{IL,offset}$ to generate the output bit sequence of the block interleaver. With the configured interleaving offset $n_{IL,offset}$, the UE may derive the output bit sequence of the block interleaver as follows:

Determine T as the smallest integer such that $Q=T(T+1)/2 \geq E$.

If $Q>E$, then the input bit sequence $e_0, e_1, e_2, \ldots, e_{E-1}$ is padded with Q–E dummy bits such that $y_k=e_k$ for $k=0, 1, 2, \ldots, E-1$ and $y_k=$<NULL> for $k=E, E+1, \ldots, Q-1$. Then the bit sequence $y_{n_{IL,offset}}, y_{n_{IL,offset}+1}, y_{n_{IL,offset}+2}, \ldots, y_{Q-1}, y_0, y_1, \ldots, y_{n_{IL,offset}-1}$ is written into the isosceles right triangle row by row starting with bit $y_{n_{IL,offset}}$ in column 0 of row 0.

The output of the block interleaver is the bit sequence read out column by column starting with bit $y_{n_{IL,offset}}$ in row 0 of column 0 with skipping all the empty and NULL element.

Assume the bit sequence $e_0, e_1, e_2, \ldots, e_{E-1}$ is interleaved into bit sequence $f_0, f_1, f_2, \ldots, f_{E-1}$, the proposed block interleaver scheme may be also expressed as follows:

Denote T as the smallest integer such that $T(T+1)/2 \geq E$;
$k=0+n_{IL,offset}$;
for i=0 to T–1
  for j=0 to T–1–i
    if k<E
      $v_{i,j}=e_k$
    else
      $v_{i,j}=$<NULL>
    end if $k = (k+1) \bmod \text{by} \left(\frac{T(T+1)}{2} + 1\right);$ end for
end for
k=0;
for j=0 to T–1
  for i=0 to T–1–j
    if $v_{i,j} \neq$ <NULL>
      $f_k=v_{i,j}$;
      k=k+1
    end if
  end for
end for After the interleaving, the UE may use the cell ID to initialize the scrambling sequence generator and generate the sequence to scramble the interleaved bit sequence. Or the UE may be configured with the group ID $N_{ID,CG-UCI}^{Group}$ to initialize the scrambling sequence generator and generate the sequence to scramble the interleaved bit sequence.

A one to one association between the DMRS and interleaving offset $n_{IL,offset}$ may be used. The DMRS here may refer to a DMRS port or a DMRS port with a certain initializer or a certain cyclic shift.

In an example, one group of UEs may be configured with the same DMRS port. The UEs configured with same DMRS port may be configured with the same interleaving offset $n_{IL,offset}$.

In another example, multiple groups of UEs where different initializers or different cyclic shifts are configured to each group respectively may be configured with the same DMRS port. The UEs configured with the same DMRS port and the same initializer/cyclic shift may be configured with the same interleaving offset $n_{IL,offset}$.

Figure 8:
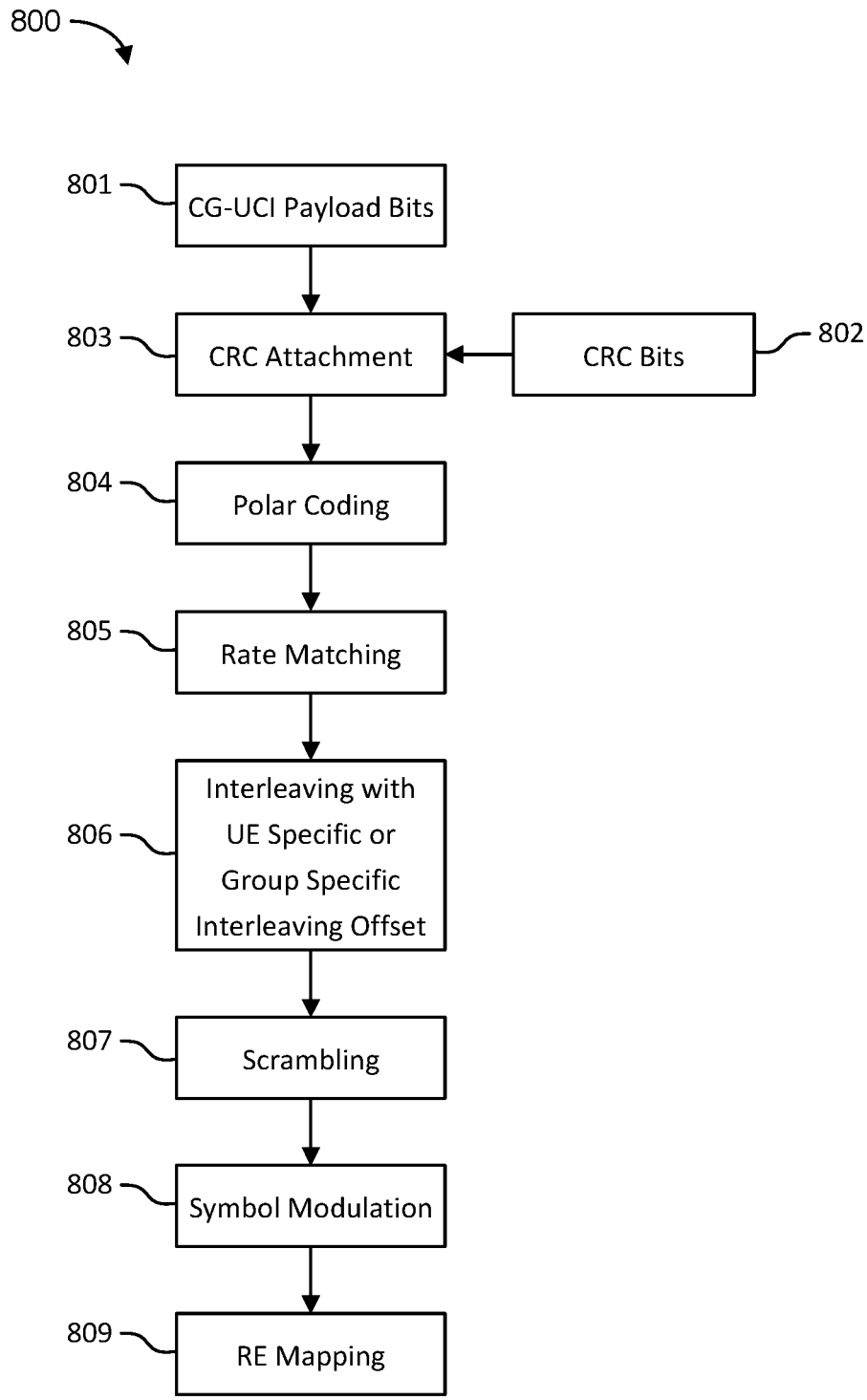
FIG. 8 is a diagram of an example data flow for a CG-UCI symbol generation with bit-level interleaving.

FIG. 8 shows an example data flow for modulated CG-UCI symbol generation with bit level interleaving 800 in accordance with one embodiment, which may be used in combination with any of the embodiments described herein. Referring to FIG. 8, the CG-UCI payload bits may be generated (step 801), the CRC parity bits may be generated (step 802), and then the bits of the CG-UCI payload may be attached with the CRC parity bits (step 803). The output bit sequence may be encoded by the Polar code (step 804) and rate matched to an output sequence with length E_tot (step 805). The rate matching output bit sequence may be interleaved by different bit level interleaver as described above (step 806). The interleaving output sequence may be scrambled prior to modulation (step 807). After the modulation (step 808), the modulated symbols may be mapped to the resource for transmitting the CG-UCI (step 809).

(4) Same symbols may be used by the UEs configured with the same configured grant to transmit the CG-UCI, the resources for different UEs may be frequency-division multiplexed (FDM-ed) or interlaced within the symbols.

Figure 9A:
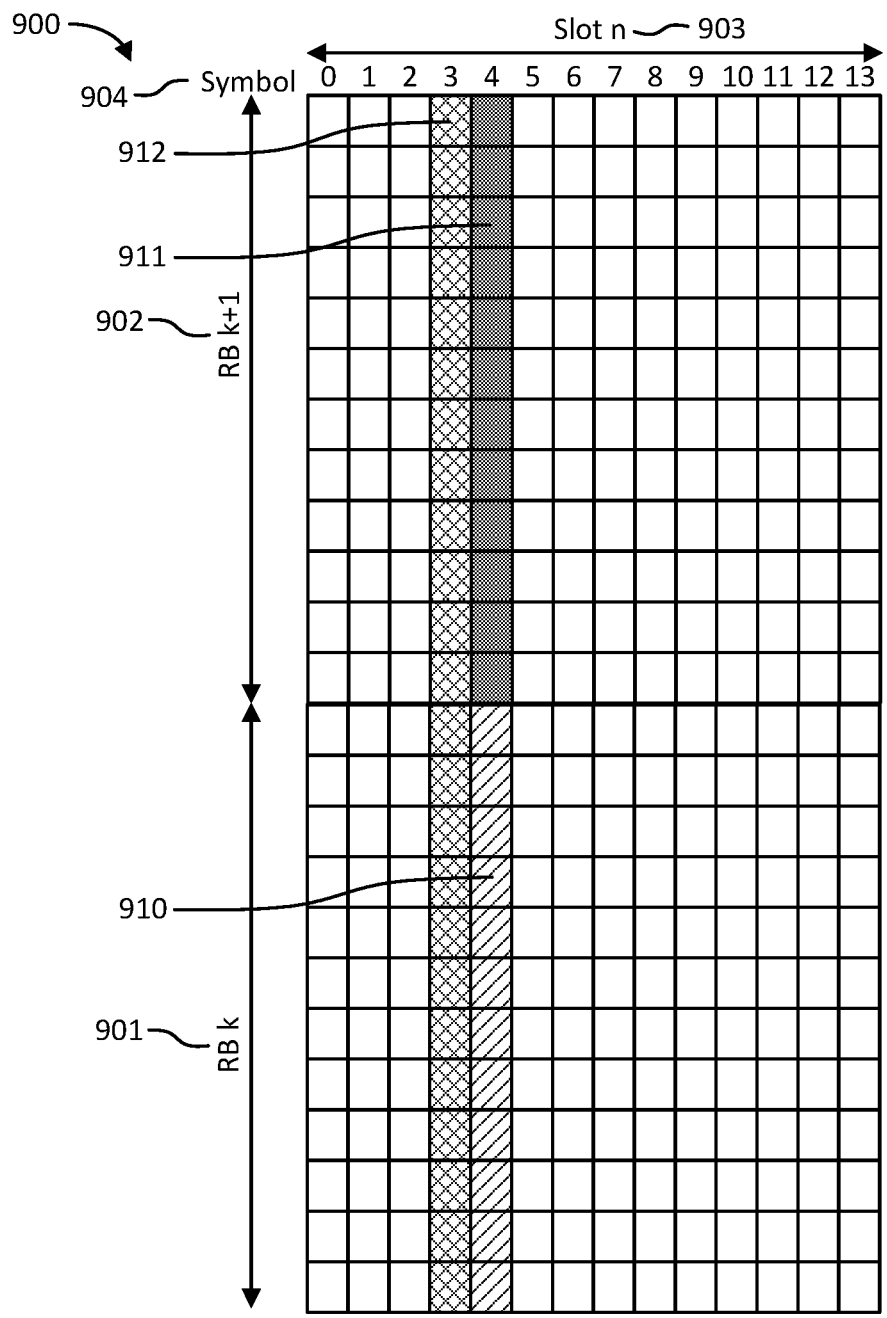
FIG. 9A is a diagram of an example of resources for transmitting a CG-UCI which are frequency-division multiplexed.

FIG. 9A shows an example a diagram of an example of resources for transmitting a CG-UCI which are frequency-division multiplexed 900 in accordance with one embodiment, which may be used in combination with any of the embodiments described herein. FIG. 9A shows the $RB_k$ 901 and $RB_{k+1}$ 902 in the frequency domain, and the slot n 903 in the time domain. Slot n 903 comprises 14 symbols 904 in the time domain. FIG. 9A shows REs for the DMRS for UE1 and the DMRS for UE2 912. In the example of FIG. 9A, the UE1 may map modulated CG-UCI symbols 911 to $RB_{k+1}$ 902 in the frequency domain, and the UE2 may map modulated CG-UCI symbols 910 to $RB_k$ 901 in the frequency domain. A different DMRS may also be used by UE 1 and UE 2 in this example. In this frequency-division multiplexed (FDM-ed) example, the UE may be configured with the starting RB index and number of the allocated RBs.

Figure 9B:
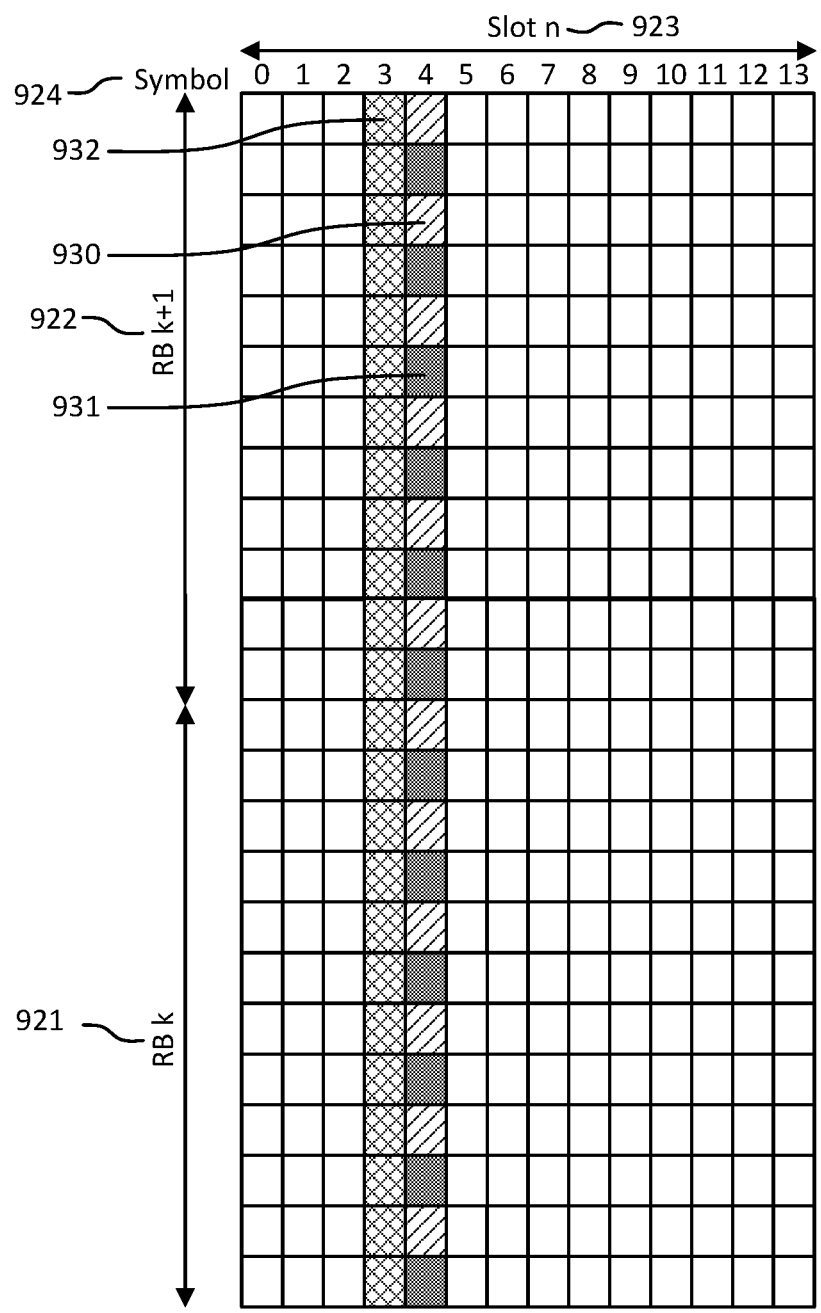
FIG. 9B is a diagram of an example of resources for transmitting a CG-UCI which are interlaced.

FIG. 9B shows an example a diagram of an example of resources for transmitting a CG-UCI in which the frequency resources configured for UEs may be interlaced at the RE level in accordance with one embodiment, which may be used in combination with any of the embodiments described herein. FIG. 9B shows the $RB_k$ 921 and $RB_{k+1}$ 922 in the frequency domain, and the slot n 923 in the time domain. Slot n 923 comprises 14 symbols 924 in the time domain. FIG. 9B shows REs for the DMRS for UE1 and the DMRS for UE2 932. In the example of FIG. 9B, the UE1 may map modulated CG-UCI symbols 931 to $RB_k$ 921 and $RB_{k+1}$ 922 in the frequency domain by interlacing at the RE level. Similarly, the UE2 may map modulated CG-UCI symbols 930 to $RB_k$ 921 and $RB_{k+1}$ 922 in the frequency domain by interlacing at the RE level. A different DMRS may also be used by UE 1 and UE 2 in this example. The interlacing may be at the block level where a block can be several REs, one RB, or several RBs. The UE may be configured with a group specific resource for CG-UCI transmitting. In this interlacing solution, the UE may be configured with the size of the interlacing, e.g., number of REs; the total number of the interlacing; and the interlacing index or the offset value. The UE may determine the candidate interlacing patterns using the configured interlacing size and total interlacing number.

Then, the UE may determine which interlacing to use based on the configured interlacing index or the offset value.

The UE may generate the modulated CG-UCI symbols as shown in the example of FIG. 5 and may map the modulated CG-UCI symbols to the configured resources. A one to one association between the DMRS and the FDM-ed or interlaced resource for transmitting the CG-UCI may be used. The DMRS here may refer to a DMRS port or a DMRS port with a certain initializer or a certain cyclic shift.

In one example, one group of UEs may be configured with the same DMRS port. The UEs configured with same DMRS port may be configured with the same FDM-ed or interlaced resource.

In another example, multiple groups of UEs, where different initializers or different cyclic shifts may be configured for each group, respectively, may be configured with the same DMRS port. The UEs configured with the same DMRS port and the same initializer/cyclic shift may be configured with the same FDM-ed or interlaced resource.

A CG-UCI signature, e.g., group ID $N_{ID,CG-UCI}^{Group}$; spreading code; interleaving offset $n_{IL,offset}$, may be configured for UE using techniques including but not limited to the following:

(1) A UE may be configured with the CG-UCI signature through RRC configuration.

In an example, a UE may be explicitly configured with the CG-UCI signature to be used for CG-UCI symbol generation through RRC configuration. For example, the UE may be explicitly configured with the group ID $N_{ID,CG-UCI}^{Group}$, spreading code index or interleaving offset value $n_{IL,offset}$.

For a UE in the RRC-Connected state, the CG-UCI signature may be configured through the UE specific RRC.

For a UE in the RRC-Inactive state, the CG-UCI signature may be configured through the UE specific RRC configuration before the UE performs the transition from RRC-Connected state to RRC-Inactive state; or through broadcast message(s) on the common or shared channel at the RRC-Inactive state, i.e. carried on the shared channel PDSCH indicated by a DCI at the common search space scrambled by INACTIVE-RNTI for a group of UEs at RRC-Inactive state. Such a resource may be periodic in time (e.g., every N subframes or slots or symbols for non-slot based) with a certain duration (e.g. in M symbols or slots) and for each BWP (e.g., initial BWP, default BWP or active BWP configured or activated for Inactive state).

In another example, a UE may be configured with the mapping between DMRS and CG-UCI signature through RRC configuration. The DMRS here may refer to a DMRS port or a DMRS port with a certain initializer or cyclic shift. The mapping may be a one to one association between the DMRS and CG-UCI signature. The UE may be configured with the mapping/association for multiple DMRS, e.g., for all the possible DMRS or for the DMRS within the configured DMRS pool for NOMA transmission. When the UE is configured with one DMRS or when it randomly picks one DMRS from the configured DMRS pool, the UE may determine the CG-UCI signature to be used based on the configured mapping/association.

For a UE in the RRC-Connected state, the mapping/association may be configured through the UE specific RRC.

For a UE in the RRC-Inactive state, the mapping/association may be configured through the UE specific RRC configuration before the UE performs the transition from RRC-Connected state to RRC-Inactive state; or through broadcasting message(s) on the common or shared channel at the RRC-Inactive state, i.e. carried on the shared channel PDSCH indicated by a DCI at the common search space scrambled by INACTIVE-RNTI for a group of UEs at RRC-Inactive state.

For a UE in the RRC-Idle state, the mapping/association may be configured through the broadcasting message, e.g., OSI, RMSI.

(2) A UE may be configured with the CG-UCI signature through RRC configuration and DCI signaling. The UE may be configured with CG-UCI signature pool through RRC configuration. The CG-UCI signature pool may contain m CG-UCI signatures, e.g., m interleaving offset values or m spreading sequences where each CG-UCI signature may have a signature index from 1 to m. A $\log_2^m$ bits DCI field CG-UCI signature indicator may be used to indicate the index of the CG-UCI signature to be used for the CG-UCI symbol generation.

The CG-UCI may be transmitted on the PUCCH configured by a configured grant. A UE may be configured with a configured grant PUCCH for transmitting the CG-UCI through dedicated configuration.

For a UE in the RRC-Connected state, the configuration may be configured through RRC configuration, e.g., through RRC information element ConfiguredGrantPUCCHConfig. Or the configuration may be signalled by the DCI with CRC scrambled with CS-RNTI.

For a UE in the RRC-Inactive state, the configuration may be configured through RRC configuration, e.g., through the UE specific RRC configuration before the UE performs the transition from RRC-Connected state to RRC-Inactive state; or through the broadcasting message on the common or shared channel at the RRC-Inactive state. Or the configuration may be signalled by a DCI at the common search space scrambled by INACTIVE-RNTI to a group of UEs at RRC-Inactive state.

For a UE in the RRC-Idle state, the configuration may be configured through the broadcasting message on the common or shared channel, e.g., through OSI or RMSI The configuration for the configured grant PUCCH may include parameters including but not limited to the following:

(1) Periodicity of the configured grant PUCCH;
(2) Offset of the configured grant PUCCH, e.g., slot offset of the configured grant PUCCH corresponding to the subframe boundary;
(3) Time resource allocation, e.g., the starting symbol and the length of the symbols;
(4) Frequency resource allocation, e.g., the starting PRB and the number of the PRBs;
(5) DMRS configuration, e.g., DMRS port index, the parameter used to initialize the DMRS sequence;
(6) Power control, e.g., index of Alpha set and index of p0-PUCCH-Alpha;
(7) Modulation order, e.g., QPSK, BPSK; and
(8) CG-UCI signature, e.g., the spreading sequence, the parameter used to initialize the scrambling sequence or the interleaving offset.

For a configured grant type 1 UE, the configured grant PUCCH may be activated once it is configured for UE and no further activation is needed. For a configured grant type 2 UE, the configured grant PUCCH may be activated when a UE receives an activation DCI, e.g., the activation DCI with CRC scrambled with CS-RNTI for a UE in RRC-Connected state; or scrambled with INACTIVEGROUP-RNTI to a group of UEs at RRC-Inactive state. If the UE does not have data to be transmitted on the configured grant PUSCH, the UE may not transmit the CG-UCI on the configured grant PUCCH.

To reduce the collision possibility of the CG-UCI transmission on the configured grant PUCCH, techniques including but not limited to the following may be used:
- (1) A UE may be configured with multiple configurations of the configured grant PUCCH. The UE may randomly select one configuration to transmit the CG-UCI.
- (2) A UE may be configured with one configuration of the configured grant PUCCH. Within the configuration, the UE may be configured with the following alternatives:
  - (a) The UE may be configured with multiple DMRS ports and it may randomly select one DMRS port to use.
  - (b) The UE may be configured with UE-specific parameter to initialize the DMRS sequence.

The gNB may identify the UE using the received CG-UCI. In one example, the UE ID may be explicitly indicated in the CG-UCI payload bits in order to identify the UE.

For a UE in RRC-Connected state, the UE may indicate its CS-RNTI in the CG-UCI payload bits.

For a UE in RRC-Inactive state, the UE may indicate its I-RNTI in the CG-UCI payload bits.

For a UE in RRC-Idle state, the UE may indicate its International Mobile Subscriber Identity (IMSI) or Dynamic Mobile Subscriber Identity (DMSI) in the CG-UCI payload bits.

In another example, the UE ID may be indicated jointly by two parts, e.g., the UE ID may be indicated by the CG-UCI payload bits and the DMRS jointly. The DMRS here may refer to a DMRS port or a DMRS port with a certain initializer or a cyclic shift. For example, a group of UEs may be configured with the same DMRS. Within each group, each UE may be configured with a local ID, e.g., L-RNTI. When a UE has UL data to be transmitted using the configured grant, the UE may use the configured DMRS and indicate the configured L-RNTI in the CG-UCI payload bits. The gNB may identify the UE by detecting the DMRS and decoding the L-RNTI from the CG-UCI.

An UL transmission may use a configured grant with an adaptive MCS. A UE, for example working in NOMA mode, may autonomously select the MCS value to be used and report it to the gNB through the CG-UCI, using techniques including but not limited to:
- (1) A UE may autonomously select its MCS value from the pre-specified or configured MCS table without being configured with a default MCS value. The UE may indicate the selected MCS value through the MCS indicatorfield bits in the CG-UCI.
  - (a) A UE may autonomously select its MCS value from the entire MCS table and report the selected MCS value through the MCS indicatorfield in CG-UCI, e.g., 5 bits may be used for the MCS indicatorfield to indicate the selected MCS index $I_{MCS}$.
  - (b) A UE may be configured with a subset of the entire MCS table. A UE may be configured with a starting MCS index $I_{MCS,start}$ and a length of the subset $L_{MCS}$ through the RRC configuration (the length of the subset $L_{MCS}$ may also be pre-specified). The UE may autonomously select its MCS value with MCS index from $I_{MCS}=I_{MCS,start}$ to $I_{MCS}=I_{MCS,start}+L_{MCS}-1$. The UE may use $\lceil \log_2 L_{MCS} \rceil$ bits to indicated index difference between the selected MCS index and the configured starting MCS index $I_{MCS,start}$. An example of the MCS indicatorfield is shown in Table 3. For example, assume a UE is configured with $I_{MCS,start}=10$ and $L_{MCS}=4$. The UE may autonomously select its MCS value from MCS index 10 to 13. If a UE selects the MCS value corresponding to the MCS index 12, the UE may indicate it by setting the MCS indicatorfield to be '10' in the CG-UCI.

TABLE 3

Example of MCS indicator field in CG-UCI alternative 1

| Bit field | UCI Content Function |
|---|---|
| 00 | Index difference between the selected MCS index and the configured starting MCS index $I_{MCS,start}$ is 0. MCS value corresponding to the MCS index $I_{MCS,start}$ is used. |
| 01 | Index difference between the selected MCS index and the configured starting MCS index $I_{MCS,start}$ is 1. MCS value corresponding to the MCS index $I_{MCS,start}+1$ is used. |
| 10 | Index difference between the selected MCS index and the configured starting MCS index $I_{MCS,start}$ is 2. MCS value corresponding to the MCS index $I_{MCS,start}+2$ is used. |
| 11 | Index difference between the selected MCS index and the configured starting MCS index $I_{MCS,start}$ is 3. MCS value corresponding to the MCS index $I_{MCS,start}+3$ is used. |

The UE may autonomously select its MCS value for both the initial transmission and the retransmission.

(2) A UE may be configured with a default MCS value $I_{MCS,default}$ through RRC configuration (configured grant type 1) or through the activation DCI (configured grant type 2). The UE may autonomously decide if to overwrite the configured default MCS value.

If the UE decides to not overwrite the configured default MCS value, the UE may indicate it through the following alternatives:
- (a) If the UE selects to use the configured default MCS value, the UE may explicitly indicate it through the MCS indicator field bits in the CG-UCI. In this case, the gNB may decode the CG-UCI with one CG-UCI length and determine the UE's MCS value through the MCS indicator field bits.
- (b): If the UE selects to use the configured default MCS value, the UE may implicitly indicate it by not including the MCS indicatorfield bits in the CG-UCI. In this case, the gNB may blindly decode the CG-UCI with two possible CG-UCI lengths. For example, assume the length of CG-UCI with MCS indicatorfield is m bits and the length of the MCS indicatorfield is k bits. The gNB may blindly decode the CG-UCI with two possible lengths: m bits and m−k bits. If the gNB detects the length of the CG-UCI is m−k bits, gNB knows the UE is using the configured default MCS value. If the gNB detects the length of the CG-UCI is m bits, gNB knows the UE has overwritten the configured default MCS value and figures out the UE's MCS value through the MCS indicator field bits.

If the UE decides to overwrite the configured default MCS value, the UE may indicate the selected MCS value through the MCS indicatorfield bits in the CG-UCI. The selected MCS value may be indicated by the following alternatives:
- (a) The UE may explicitly indicate the MCS index $I_{MCS}$ of the selected MCS value using 5 bits through the MCS indicatorfield in the CG-UCI.
- (b) The UE may indicate the selected MCS value by indicating the index difference between the selected MCS index and the configured default MCS index. A UE may be configured with a subset of the MCS values in the MCS table that the UE may autonomously select around the default MCS index $I_{MCS,default}$. For example, a UE may be configured with the maximum value of index different $I_{Difference,max}$ that a UE can choose from. The index different $I_{Difference,max}$ may be pre-specified or configured by RRC configuration.

If a UE explicitly indicates that it selects the default MCS value, i.e., the UE may indicate that it selects the default MCS value through the MCS indicator field bits. The UE may use $\lceil \log_2^{I_{Difference,max}+1} \rceil + 1$ bits to indicated index difference between the selected MCS index and the configured default MCS index $I_{MCS,default}$. For example, if a UE is configured with $I_{Difference,max}=3$, the UE may autonomously select the MCS value with MCS index from $I_{MCS}=I_{MCS,default}-3$ to $I_{MCS}=I_{MCS,default}+3$. The UE may use 1 most significant bit (MSB) bit in the MCS indicatorfield to indicate whether the selected MCS index is larger or smaller than the default MCS index, e.g., '0' indicates the selected MCS index is smaller than the default MCS index; '1' indicates the selected MCS index is larger than the default MCS index. The UE may use the rest 2 bits in the MCS indicatorfield to indicate the index difference between the selected MCS index and the configured default MCS index. An example of the MCS indicatorfield is shown in Table 4. For example, assume a UE is configured with $I_{MCS,default}=10$, if a UE selects the MCS value corresponding to the MCS index 12, the UE may indicate it by setting the MCS indicator field to be '110' in the CG-UCI; if a UE selects the MCS value corresponding to the MCS index 7, the UE may indicate it by setting the MCS indicator field to be '011' in the CG-UCI. In this example, both '000' and '100' may explicitly indicate the UE selects to use the default MCS value.

TABLE 4

Example of MCS indicator field in CG-UCI alternative 2

Bit field UCI Content Function

| | |
|---|---|
| 000 | The select MCS index is smaller than the default MCS index and the index different is 0. MCS index $I_{MCS,default}$ is used |
| 001 | The select MCS index is smaller than the default MCS index and the index different is 1. MCS index $I_{MCS,default} - 1$ is used |
| ... | ... |
| 011 | The select MCS index is smaller than the default MCS index and the index different is 3. MCS index $I_{MCS,default} - 3$ is used |
| 100 | The select MCS index is larger than the default MCS index and the index different is 0. MCS index $I_{MCS,default}$ is used |
| 101 | The select MCS index is larger than the default MCS index and the index different is 1. MCS index $I_{MCS,default} + 1$ is used |
| ... | ... |
| 111 | The select MCS index is larger than the default MCS index and the index different is 3. MCS index $I_{MCS,default} + 3$ is used |

If a UE implicitly indicates that it selects the default MCS value, i.e., the UE may indicate that it selects the default MCS value by not including the MCS indicator bits in the CG-UCI. The UE may use $\lceil \log_2^{I_{Difference,max}} \rceil + 1$ bits to indicated index difference between the selected MCS index and the configured default MCS index $I_{MCS,default}$. For example, if a UE is configured with $I_{Difference,max}=4$, the UE may autonomously select the MCS value with the MCS index from $I_{MCS}=I_{MCS,default}-4$ to $I_{MCS}=I_{MCS,default}+4$. The UE may use 1 most significant bit (MSB) bit in the MCS indicatorfield to indicate whether the selected MCS index is larger or smaller than the default MCS index, e.g., '0' indicates the selected MCS index is smaller than the default MCS index; '1' indicates the selected MCS index is larger than the default MCS index. The UE may use the other 2 bits in the MCS indicatorfield to indicate the index difference between the selected MCS index and the configured default MCS index, where '00' indicates the index difference is 1; '01' indicates the index difference is 2, etc. An example of the MCS indicatorfield is shown in Table 5. For example, assume a UE is configured with $I_{MCS,default}=10$, if a UE selects the MCS value corresponding to the MCS index 11, the UE may indicate it by setting the MCS indicatorfield to be '100' in the CG-UCI; if a UE selects the MCS value corresponding to the MCS index 6, the UE may indicate it by setting the MCS indicatorfield to be '011' in the CG-UCI.

TABLE 5

Example of MCS indicator field in CG-UCI alternative 3

Bit field UCI Content Function

| | |
|---|---|
| 000 | The select MCS index is smaller than the default MCS index and the index different is 1. MCS index $I_{MCS,default} - 1$ is used |
| 001 | The select MCS index is smaller than the default MCS index and the index different is 2. MCS index $I_{MCS,default} - 2$ is used |
| ... | ... |
| 011 | The select MCS index is smaller than the default MCS index and the index different is 4. MCS index $I_{MCS,default} - 4$ is used |
| 100 | The select MCS index is larger than the default MCS index and the index different is 1. MCS index $I_{MCS,default} + 1$ is used |
| 101 | The select MCS index is larger than the default MCS index and the index different is 2. MCS index $I_{MCS,default} + 2$ is used |
| ... | ... |
| 111 | The select MCS index is larger than the default MCS index and the index different is 4. MCS index $I_{MCS,default} + 4$ is used |

If a UE is configured with a default MCS value, the UE may use the default MCS value for the initial transmission. If the initial transmission is NACKed or the UE doesn't receive feedback within a timer, the UE may autonomously select its MCS value for retransmission. Or the UE may autonomously select if to overwrite the configured default MCS value for both the initial transmission and the retransmission.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 10A:
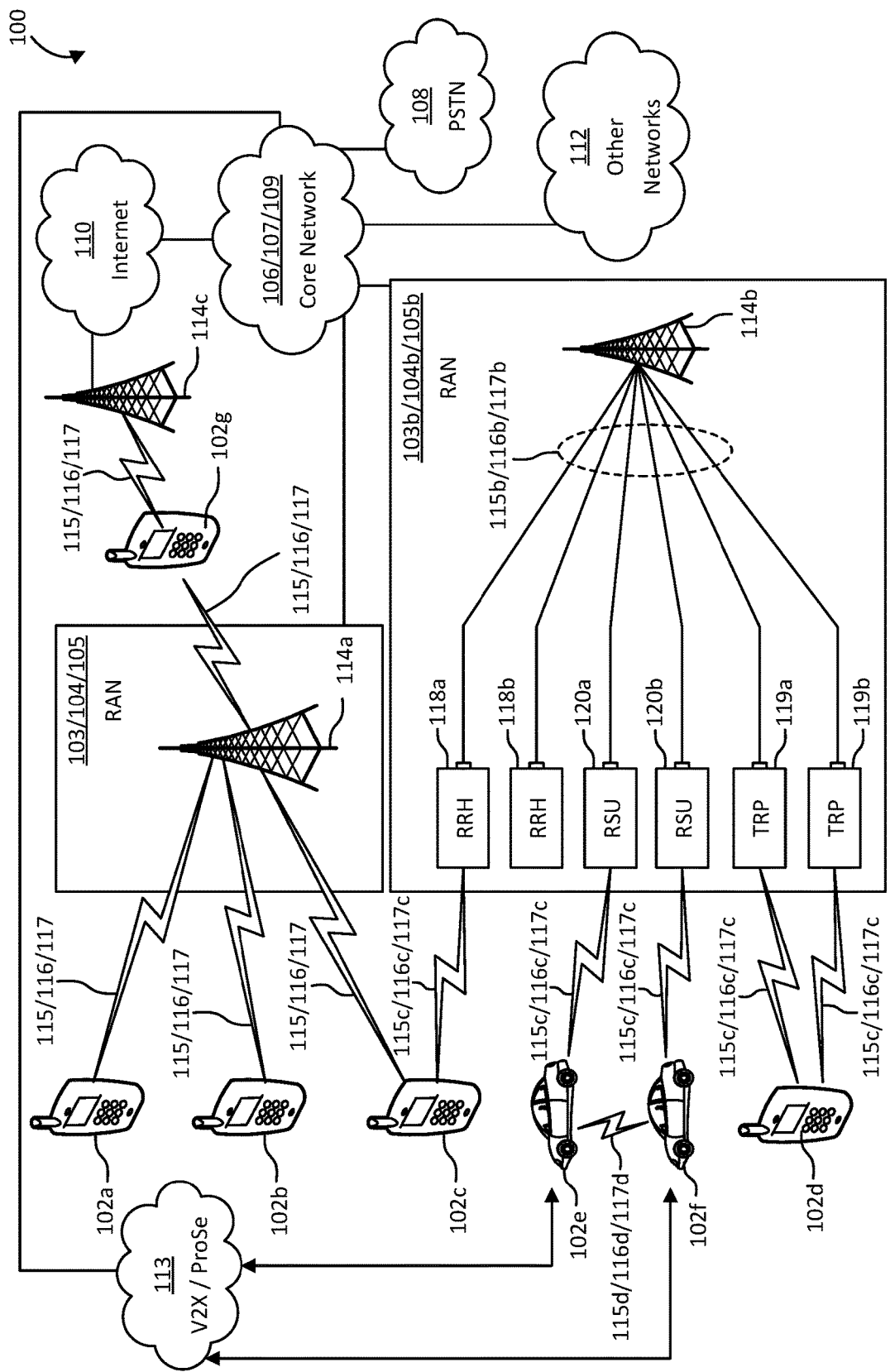
FIG. 10A illustrates one embodiment of an example communications system in which the methods and apparatuses described and claimed herein may be embodied.

FIG. 10A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 10A-10E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include abase station 114a and abase station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be abase transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 10A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 10A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 10A may be configured to communicate with the base station 114*a*, which may employ a cellular-based radio technology, and with the base station 114*c*, which may employ an IEEE 802 radio technology.

Figure 10B:
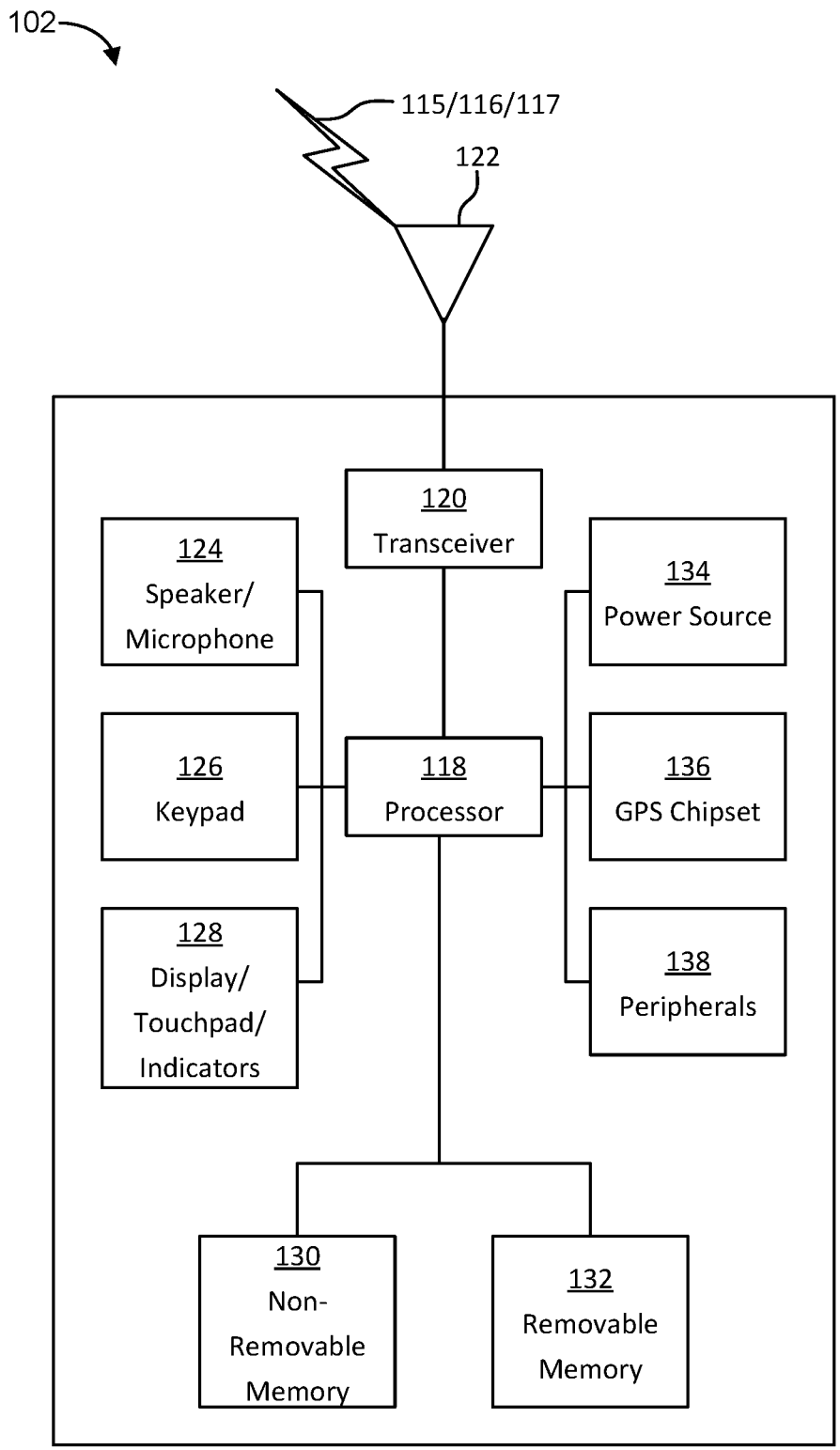
FIG. 10B is a block diagram of an example apparatus or device configured for wireless communications in accordance with the embodiments illustrated herein.

FIG. 10B is a block diagram of an example apparatus or device configured for wireless communications in accordance with the embodiments illustrated herein, such as for example, a WTRU 102. As shown in FIG. 10B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 10B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 10B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 10C:
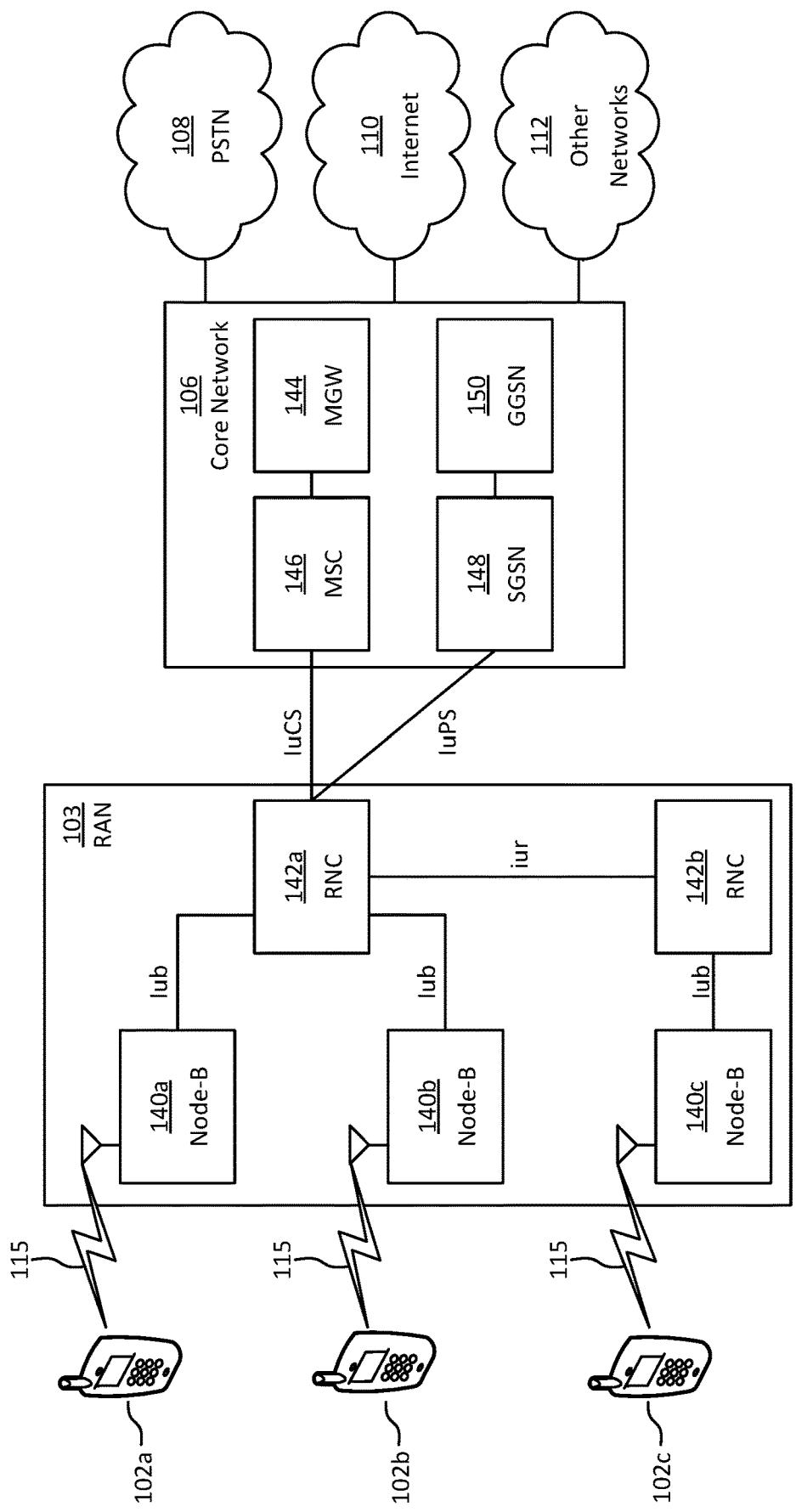
FIG. 10C is a system diagram of a RAN and core network according to an embodiment.

FIG. 10C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 10C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 10C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 10C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 10D:
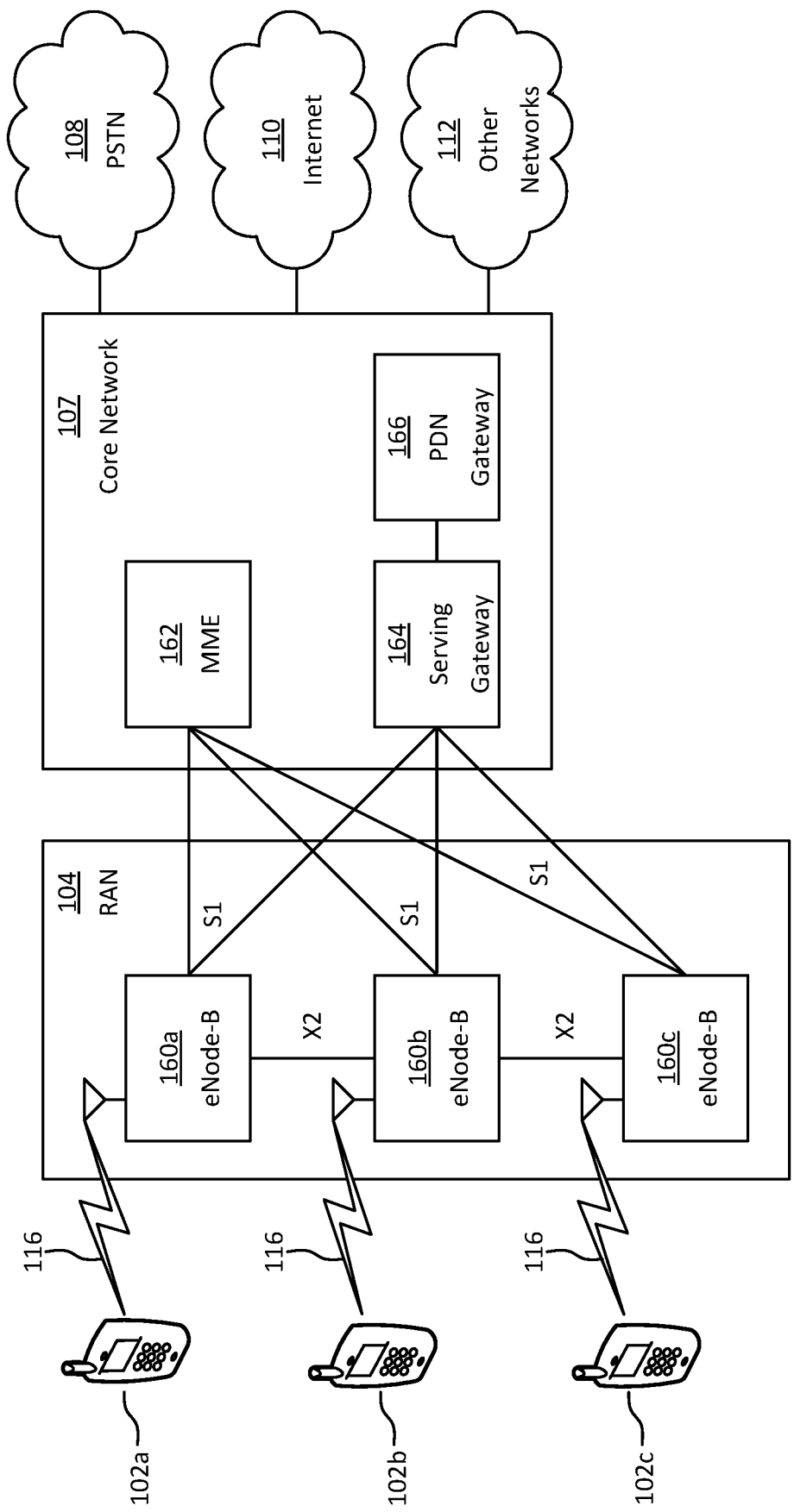
FIG. 10D is a system diagram of a RAN and core network according to an embodiment.

FIG. 10D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 10D, the eNode-Bs 160a, 160b, 160c may communicate with one another over an X2 interface.

The core network 107 shown in FIG. 10D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 10E:
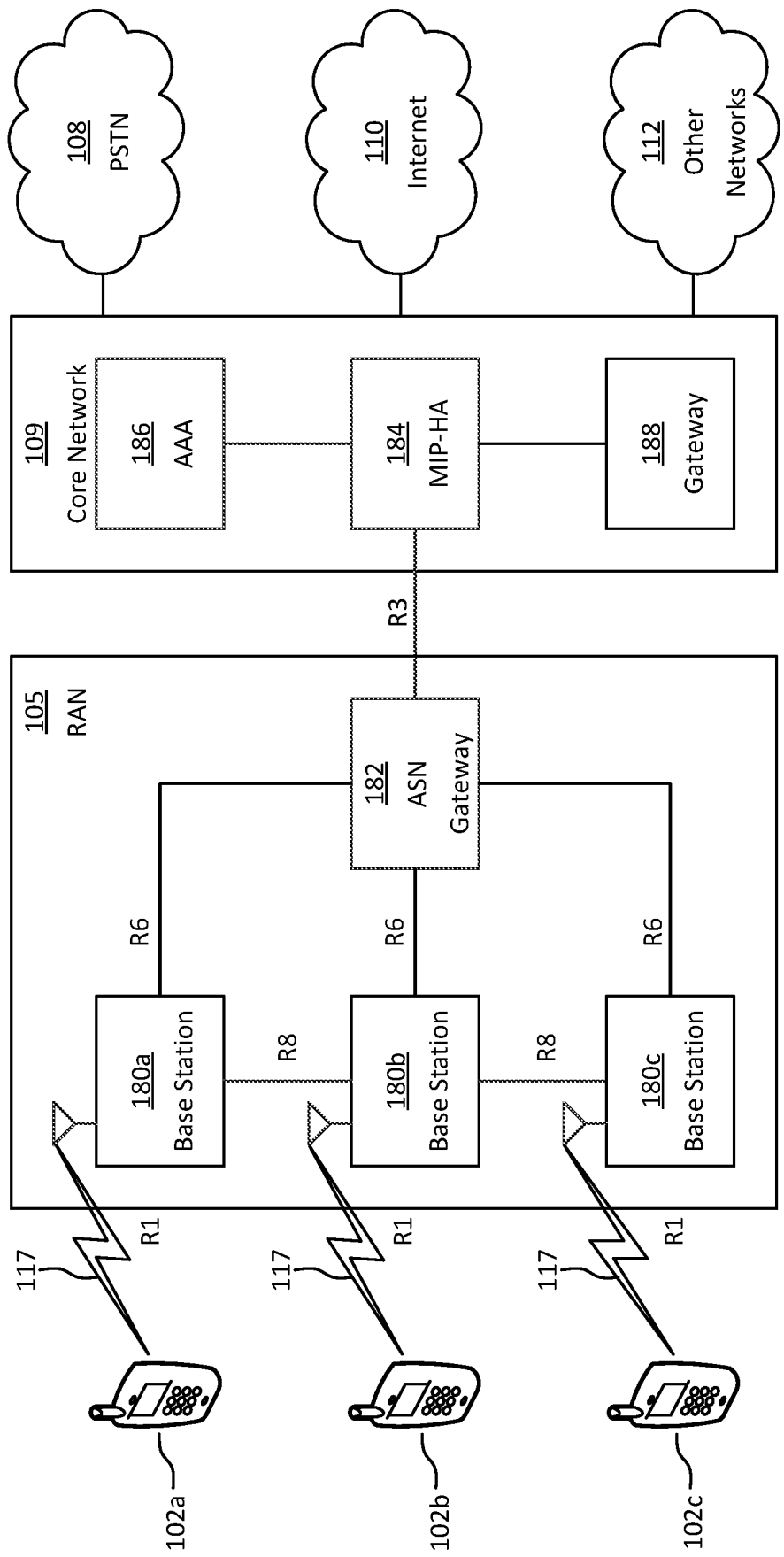
FIG. 10E is a system diagram of a RAN and core network according to an embodiment.

FIG. 10E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 10E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 10E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 10E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 10A, 10C, 10D, and 10E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 10A, 10B, 10C, 10D, and 10E are provided by way of example only, and it is understood that the subject matter disclosed and claimed herein may be embodied or implemented in any similar communication system, whether presently defined or defined in the future.

Figure 10F:
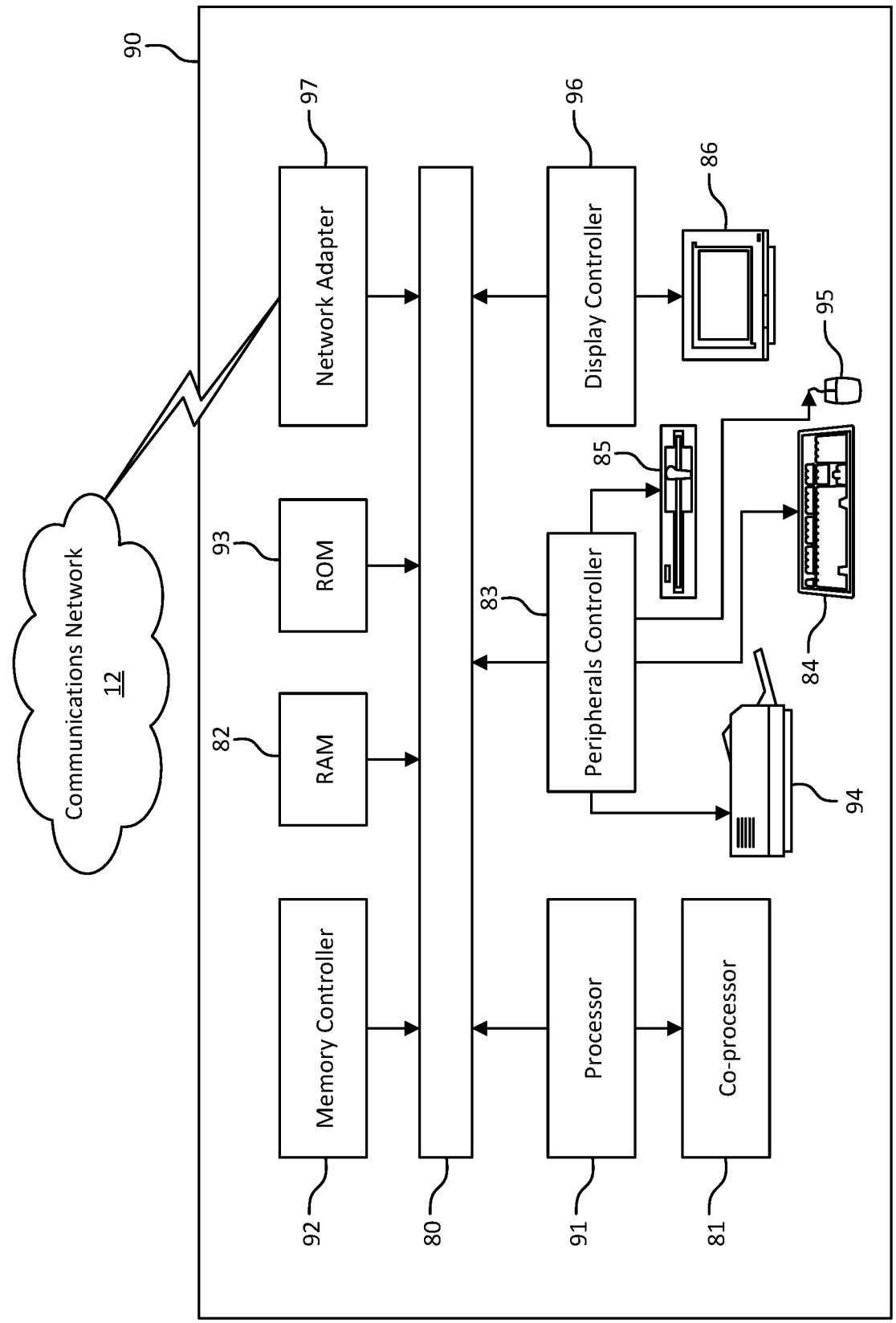
FIG. 10F is a block diagram of an exemplary computing system in which one or more apparatuses of the communications networks illustrated in FIGS. 10A, 10C, 10D and 10E may be embodied.

FIG. 10F is a block diagram of an exemplary computing system 90 in which one or more apparatuses of the communications networks illustrated in FIGS. 10A, 10C, 10D and 10E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 10A, 10B, 10C, 10D, and 10E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 10G:
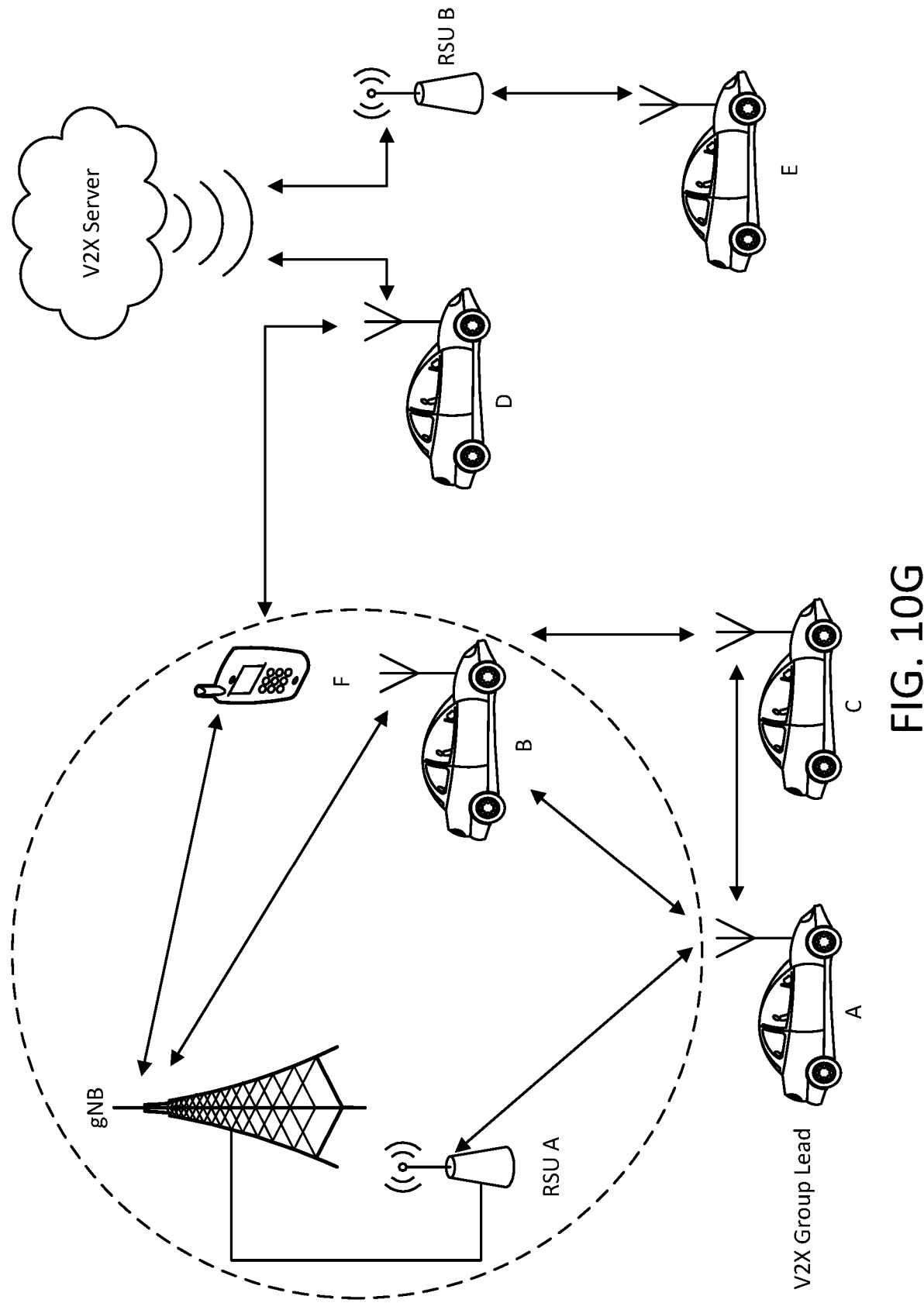
FIG. 10G illustrates one embodiment of an example communications system in which the methods and apparatuses described and claimed herein may be embodied.

FIG. 10G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless communications device comprising a processor and a memory, the wireless communications device further including computer-executable instructions stored in the memory of the wireless communications device which, when executed by the processor of the wireless communications device, cause the wireless communications device to:
   receive, from a gNB, first information indicating a plurality of resources for a configured grant (CG) on a physical uplink shared channel (PUSCH);
   determine, based on second information, a portion of the plurality of resources to use for transmitting a configured grant-uplink control information (CG-UCI), wherein the second information comprises a radio resource control (RRC) parameter enabling the wireless communications device to calculate a number of symbols or resource elements to use for transmitting the CG-UCL, the RRC parameter comprising CG-UCI signature corresponding to an offset value dedicated to the CG-UCI; and
   transmit, to the gNB on the PUSCH, the CG-UCI using the determined portion of the plurality of resources, wherein the determined portion of the plurality of resources comprises symbols mapping the CG-UCI first and then a hybrid automatic repeat request (HARQ) acknowledgement (ACK), and wherein the symbols are generated using the CG-UCI signature.

2. The wireless communications device of claim 1, wherein the determined portion of the plurality of resources comprises symbols following symbols carrying a demodulation reference signal.

3. The wireless communications device of claim 1, wherein the CG-UCI is attached with cyclic redundancy check parity bits.

4. The wireless communications device of claim 1, wherein the second information is configured via RRC signaling.

5. The wireless communications device of claim 1, wherein the second information is based on a predetermined configuration.

6. The wireless communications device of claim 1, wherein the computer-executable instructions, when executed by the processor of the wireless communications device, further cause the wireless communications device to:
   generate the CG-UCI, wherein the CG-UCI comprises at least one of: an identifier associated with the wireless communications device or an indication of a modulation and coding scheme (MCS).

7. A method for use in a wireless communication device, comprising:
   receiving, from a gNB, first information indicating a plurality of resources for a configured grant (CG) on a physical uplink shared channel (PUSCH);
   determining, based on second information, a portion of the plurality of resources to use for transmitting a configured grant-uplink control information (CG-UCI), wherein the second information comprises a radio resource control (RRC) parameter enabling the wireless communications device to calculate a number of symbols or resource elements to use for transmitting the CG-UCI, the RRC parameter comprising CG-UCI signature corresponding to an offset value dedicated to the CG-UCI; and transmitting, to the gNB on the PUSCH, the CG-UCI using the determined portion of the plurality of resources, wherein the determined portion of the plurality of resources comprises symbols mapping the CG-UCI first and then a hybrid automatic repeat request (HARQ) acknowledgement (ACK), and wherein the symbols are generated using the CG-UCI signature.

8. The method of claim 7, wherein the determined portion of the plurality of resources comprises symbols following symbols carrying a demodulation reference signal or symbols preceding symbols carrying a demodulation reference signal.

9. The method of claim 7, wherein the CG-UCI is attached with cyclic redundancy check parity bits.

10. The method of claim 7, wherein the second information is configured via RRC signaling.

11. The method of claim 7, wherein the second information is based on a predetermined configuration.

12. The method of claim 7, further comprising:
generating the CG-UCI wherein the CG-UCI comprises at least one of: an identifier associated with the wireless communications device or an indication of a modulation and coding scheme (MICS).

13. A method for use in a network node in a wireless communication system, the method comprising:

transmitting, to a user equipment (UE), first information indicating a plurality of resources for a configured grant (CG) on a physical uplink shared channel (PUSCH); and receiving, from the UE on the PUSCH, a configured grant-uplink control information (CG-UCI) using a first portion of the plurality of resources, wherein the first portion of the plurality of resources is determined based on second information comprising a radio resource control (RRC) parameter enabling the UE to calculate a number of symbols or resource elements to use for transmitting the CG-UCI, the RRC parameter comprising CG-UCI signature corresponding to an offset value dedicated to the CG-UCI, and wherein the determined portion of the plurality of resources comprises symbols mapping the CG-UCI first and then a hybrid automatic repeat request (HARQ) acknowledgement (ACK), and wherein the symbols are generated using the CG-UCI signature.

14. The method of claim 13, wherein the determined portion of the plurality of resources comprises symbols following symbols carrying a demodulation reference signal.

* * * * *